United States Patent [19]

Yoder

[11] Patent Number: 5,111,400
[45] Date of Patent: May 5, 1992

[54] AUTOMATIC INTEGRATED REAL-TIME FLIGHT CREW INFORMATION SYSTEM
[76] Inventor: Evan W. Yoder, 5351 W. Co. Rd. 300 South, R.R. 2, Russiaville, Ind. 46979
[21] Appl. No.: 611,454
[22] Filed: Nov. 13, 1990

Related U.S. Application Data

[63] Continuation of Ser. No. 311,827, Mar. 16, 1987, abandoned.
[51] Int. Cl.$^5$ .................. G06F 7/70; G06F 15/48; G06F 15/50; G01S 13/00
[52] U.S. Cl. ................. 364/424.01; 364/424.06; 364/439; 364/461; 342/29; 342/36; 342/455
[58] Field of Search ............ 364/424.01, 424.06, 364/439–441, 460, 461; 342/26, 29, 30, 36, 455, 460

[56] References Cited

U.S. PATENT DOCUMENTS

| | | |
|---|---|---|
| 3,130,401 | 4/1964 | Murphy . |
| 3,504,165 | 3/1970 | Richardson et al. . |
| 3,611,371 | 10/1971 | Morse . |
| 3,623,090 | 11/1971 | Gilbert et al. . |
| 3,668,403 | 6/1972 | Meilander ............ 364/440 |
| 3,750,166 | 7/1973 | Dearth ................. 342/30 |
| 3,775,766 | 11/1973 | Gendreu et al. ....... 342/26 X |
| 3,808,598 | 4/1974 | Carter . |
| 3,925,750 | 12/1975 | Gilbert et al. . |
| 3,944,998 | 3/1976 | Perkins . |
| 3,973,258 | 8/1976 | Cerni et al. ............ 342/26 |
| 4,063,073 | 12/1977 | Strayer ................. 364/439 |
| 4,196,474 | 4/1980 | Buchanan et al. . |
| 4,224,669 | 9/1980 | Brame ................. 364/460 X |
| 4,274,096 | 6/1981 | Dennison . |
| 4,428,052 | 1/1984 | Robinson et al. . |
| 4,454,510 | 6/1984 | Crow . |
| 4,510,499 | 4/1985 | Chisholm et al. . |
| 4,521,857 | 6/1985 | Reynolds, III ........ 342/26 X |
| 4,642,775 | 2/1987 | Cline et al. . |
| 4,706,198 | 11/1987 | Thurman .............. 364/439 |
| 4,706,199 | 11/1987 | Guerin ................. 364/460 |

OTHER PUBLICATIONS

Traffic-Watch Article, International Journal of Aviation Safety, 1983.
Unclogging the Nation's Airways Article, U.S. News & World Report.
Anti-Collision Unit for GA: Outlook Poor Article, Aviation Safety, Mar. 1, 1989.
Stormscope Series II Weather Mapping Systems Advertisement, 3M Aviation Safety Systems.
Tri-Service Jtids: Now Nobody's in the Dark Advertisement, Collins Government Avionics Division, Rockwell International.
Panel Panoply Article, 1988 Avionics Director and Buyer's Guide, Aopa Pilot, Jun. 1988.
IEEE Spectrum Aug. 1970, pp. 76-89 "At the Crossroads in Air-Traffic Control", by Gordon D. Friedlander.

Primary Examiner—Parshotam S. Lall
Assistant Examiner—E. J. Pipala
Attorney, Agent, or Firm—Woodard, Emhardt, Naughton Moriarty & McNett

[57] ABSTRACT

An integrated real-time information dissemination system for aircraft within a predetermined range of an air traffic control facility (ATC), includes airborne components for receiving ground-disseminated data concerning dynamic conditions, such as air traffic and meteorological conditions, and for storing data concerning static features, such as terrain and moving map features, within the range of the ATC. An airborne computer and display is provided in a subject aircraft for generating a continuously updated integrated graphic display of representations of the dynamic and static conditions. The graphic display is egocentric with respect to the ATC until the subject aircraft has been identified to the ATC, after which the graphic display is egocentric with respect to the subject aircraft. The airborne computer includes a computer program for detecting potential collisions with the dynamic or static features and for issuing a warning based upon the level of collision threat. When a potential collision is detected, the aircraft display isolates the threatening target and provides critical information to facilitate collision avoidance actions. The system provides real-time information to the flight crew of air traffic that has been previously restricted to ground-based air traffic controllers, to provide an added level of security against mid-air collisions and crashes caused by inadequate or erroneous information provided to the ATC or flight crew.

19 Claims, 22 Drawing Sheets

FORMAT OF EACH DATA PACKET (48 bits) IN DATA STREAM

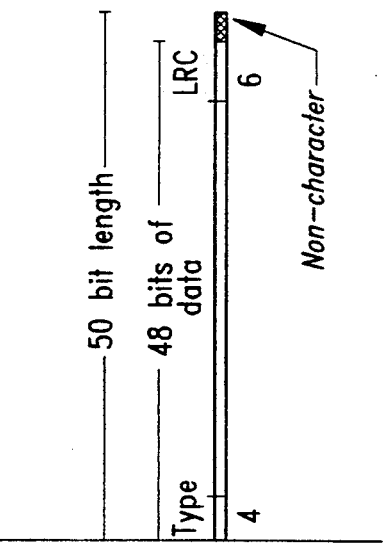

Types:

Four bits allow defining up to sixteen GENERAL types of data.

- 0000   No type. Packets can be linked, so a packet linked to a preceding packet carries a type 0000.
- 0001   ATIS information.
- 0010   WEATHER information
- 0010   TERRAIN information. This is only those features (such as a new TV antenna tower) that have been the latest additions to chart information.
- 0100   AIR TRAFFIC std. resolution.
- 0110   AIR TRAFFIC std. resolution. linked to ADDL. RESOLUTION PACKET of DATA.
- 0101   AIR TRAFFIC std. resolution. linked to "CALL-UP" IDENTITY PACKET of DATA.
- 0111   AIR TRAFFIC std. resolution. linked to both ADDL. RESOLUTION and CALL-UP IDENTITY packets.
- 1000   MESSAGES to AIR TRAFFIC.
- 1001 ⎱
- 1001 ⎰ RESERVED for SYSTEM ENHANCEMENTS, EXPANSIONS, etc.

Fig. 4b

Confict of 58W and U443 resulting in "ADVISORY"

Confict of 58W and U443 resulting in "ALERT"

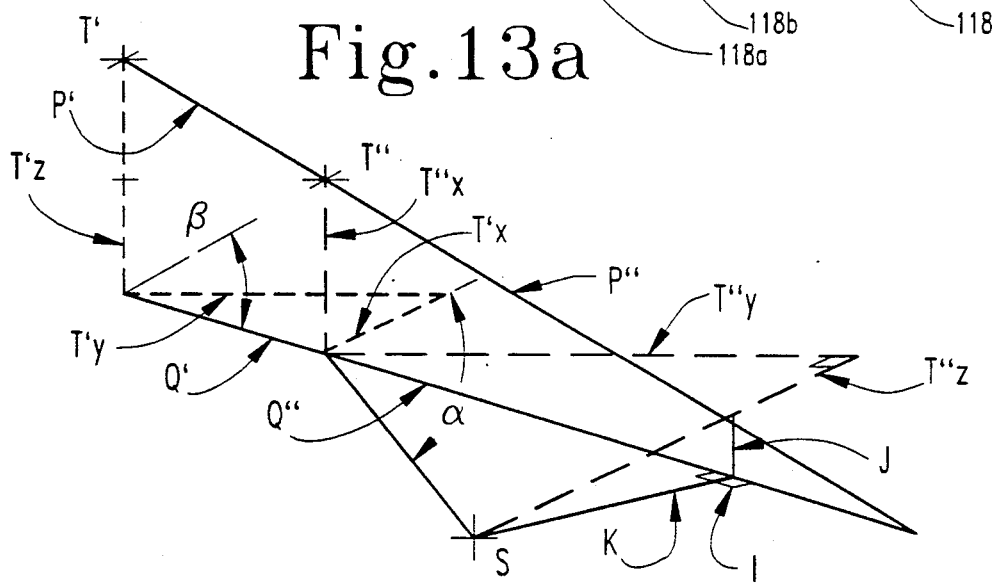
Fig.13a
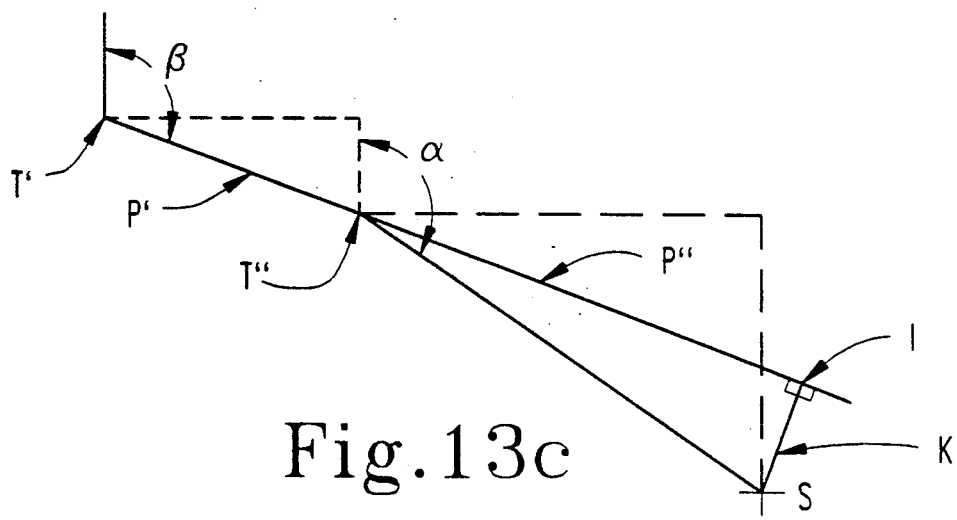
Fig.13b
Fig.13c

AUTOMATIC INTEGRATED REAL-TIME FLIGHT CREW INFORMATION SYSTEM

This application is a continuation of application Ser. No. 311,827, filed Mar. 16, 1989 now abandoned.

BACKGROUND OF THE INVENTION

This invention relates to a system for disseminating and displaying information to the flight crew of aircraft in commercial or private aviation. In particular, this invention focuses on combining information derived from ground-based and airborne sources to aid in the navigation, air traffic control, and collision avoidance aspects of aviation.

The task of a flight crew in commerical or private aviation is an information intensive task—that is, the pilot must assimilate information concerning the weather, wind shears, winds aloft, air traffic in his vicinity, similar factors at his destination, landing factors, navigation, terrain, and parameters describing the movement of his own aircraft. In the past, most of this information has been garnered from a variety of sources, with some of it only being available from ground control personnel at an air traffic control facility. Although a pilot has the ultimate responsibility for his aircraft, and may countermand any instructions tendered by ground control personnel or air traffic controllers, in a number of recent instances critical information was not passed on for the pilot to make an informed decision. A number of aviation diasters have occurred due to errors at the ground control facility or due to misunderstandings or lack of communication between air traffic control and the crews of conflicting aircraft.

As a response to the ever increasing air traffic congestion surrounding air traffic control areas in large metropolitan regions, some proposals have been made for airborne systems to aid in collision avoidance. One such system is represented by the patent to Dennison, U.S. Pat. No. 4,274,096, issued in 1981, in which aircraft position information typically provided to the air traffic control visual display CRT is also sent to a similar CRT on board the aircraft in the terminal control area (TCA) surrounding the ATC. The system of Dennison is transponder based and provides only a limited amount of information to the pilot of each aircraft in the control space.

SUMMARY OF THE INVENTION

In light of the limitations of the information systems of the prior art, it is an important object of the present invention to provide a fully automatic integrated real-time information dissemination system to all aircraft within the range of an air traffic control facility. It is another object to provide an airborne display of all pertinent data so that the commercial or private pilot will have adequate information to insure a safe flight between destinations.

It is a further object of the present invention to provide an information dissemination system that can reliably transmit information from a ground-based air traffic control center, and that can integrate the ground transmitted information with information provided by an airborne information storage and retrieval system. Another purpose of the present invention is to provide an integrated display of weather, terrain, aircraft traffic, and supplemental information that can be reviewed as needed by the pilot and that is subordinated to collision avoidance information.

To accomplish these objectives, one embodiment of the invention comprises an airborne integrated real-time information dissemination system for aircraft within a predetermined range of an air traffic control facility (ATC), which includes a ground station having an information collection system, such as primary radar, for collecting information corresponding to dynamic conditions within the range of the ATC relative to the ATC. The information includes continuously updated position data corresponding to the position of every one of a plurality of aircraft. The ground station includes a transmitter for omnidirectionally continuously transmitting a data signal, including the aircraft position data, at a predetermined time interval corresponding, for instance, to the primary radar sweep rate. The airborne information dissemination system of this invention includes a receiver tuned to the ground station transmitter for receiving the data signal and a display screen for graphically displaying representations of the dynamic conditions about the ATC, such as the current positions of aircraft corresponding to the position data, in which the representations are updated at each reception of the data signal. The display is initially egocentric with respect to the ATC with the ATC oriented at the focus of the display. The display can be selectably made egocentric with respect to the subject aircraft with the subject aircraft at the focus of the display, which occurs automatically in the preferred embodiment once the subject aircraft has been identified to the ground station. In another aspect of this embodiment, the dynamic conditions includes meteorological conditions which are graphically displayed on the aircraft display along with the current positions of the aircraft within the range of the ATC. The aircraft information display system can also include a storage medium containing moving map data corresponding to static features, such as terrain and airport features, which can be integrated onto the graphic display with the aircraft position and meteorological conditions representations.

In another embodiment, the subject aircraft includes receiver means for receiving the dynamic conditions data from two ground stations and for storing the first dynamic conditions data from one ground station while the second dynamic conditions data for the other ground station remains in storage. The airborne system includes means for switching the graphic display between a display of representations of the stored first dynamic conditions data and the stored second dynamic conditions data.

In another embodiment of the invention an airborne integrated real-time air traffic control system for aircraft within a predetermined range of the ATC comprises a receiver tuned to the ground station for receiving the data signal and a display screen on which a representation of the current positions of the plurality of aircraft is graphically displayed. The display is egocentric with respect to the subject aircraft. The subject aircraft further includes a collision avoidance system having a computer with a memory for storing the position data for the plurality of aircraft for a most recent number of predetermined time intervals. A program resident in the computer use the stored position data to predict a point of closest approach of a target aircraft to the subject aircraft and calculate a path of potential collision between the subject aircraft and the target aircraft. Another program is provided for displaying a representation of the path integrated on the display screen with the display of the current position of the subject aircraft. In another aspect of this embodiment, the computer includes an algorithm for issuing different levels of warnings based upon a calculated time until closest approach. When an evasion warning is issued, the system causes the representation of the target aircraft to flash on the display screen and a display of the time and separation distance, as well as a collision avoidance maneuver, is displayed. When a potential collision is detected, the display automatically switches to a mode in which only the target and subject aircraft representations are displayed along with the relative track of the target aircraft. The collision avoidance system of the invention also generates collision warnings for terrain and other static features associated with moving map data.

Other objects and benefits of the present invention will be exposed through the following disclosure and accompanying figures.

BRIEF DESCRIPTION OF THE DRAWINGS

FIG. 4b is a schematic representation of the format of a data packet transmitted from the ground-based system.

FIG. 13a is a decision block for issuance of the conflict warnings represented in FIGS. 11a-11c.

FIG. 13b is a three-dimensional vector diagram illustrating the vector calculations performed for determining the existence of an aircraft conflict.

FIG. 13c is a vector diagram derived from the vector diagram on FIG. 13b showing the vector projections on a horizontal plane including the subject aircraft.

DESCRIPTION OF THE PREFERRED EMBODIMENT

Figure 1:
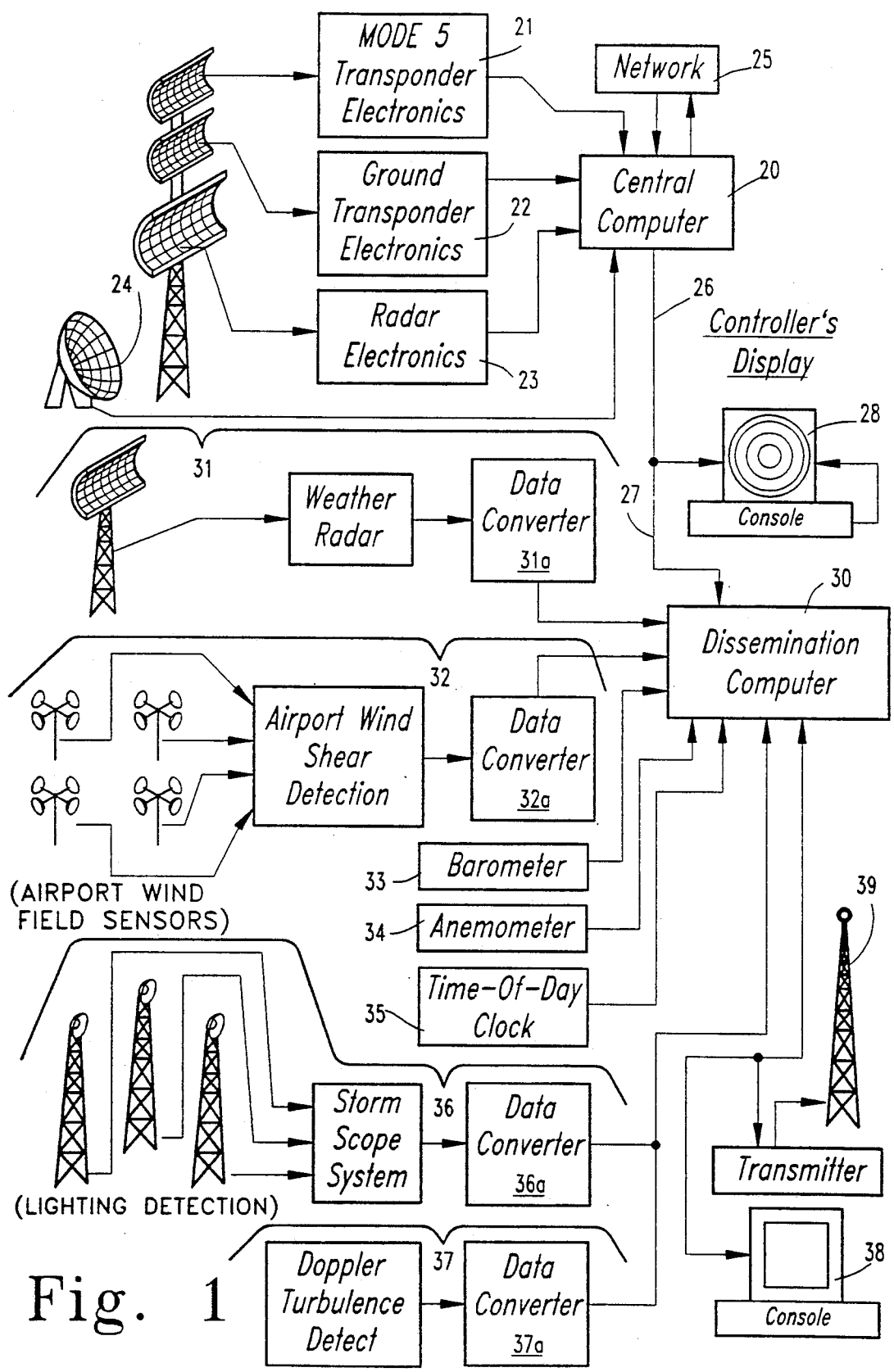
FIG. 1 is a block diagram of the ground-based portion of the information dissemination system of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

THE GROUND-BASED SYSTEM

In the preferred embodiment of the information dissemination system of the present invention, the ground-based portion of the system includes a central computer 20 as shown in FIG. 1. The central computer 20 receives data from several traffic surveillance means, such as primary radar 23, mode A/mode C ATCRBS transponder 22, mode S transponder 21, satellite 24, VHF data link (not shown), etc. The surveillance antennae 21-24 provide the range, bearing, altitude, and transponder I.D. information, when available, for all targets within the surrounding airspace of the ground-based station. The central computer 20 can also be linked with computers at other ATC's via a network 25. The network 25 is used to share information in real time between ATC facilities.

Presently, at an ATC facility, data is fed from the central computer 20 to a controller's display 28 via a data bus 26. The controller's display 28 includes a CRT on which the controller may choose, for air traffic control purposes, to display or not to display, for his own viewing, certain targets, such as primary radar targets and, at busy times, VFR "1200" targets.

In a deviation from the traditional ATC system, a second data bus 27 provides all target information to a dissemination computer 30 for conversion to a format suitable for broadcast over the airwaves. Thus, information concerning target aircraft is transferred via the data bus 27 to the dissemination computer 30. The dissemination computer also receives information from several other sources, including a weather radar system 31 for detecting and locating weather conditions, and airport wind shear detection 32 for defining wind shear conditions around the airfield. Barometric pressure and windspeed at the ATC are sensed by the barometer 33 and anemometer 34, respectively, and fed to the dissemination computer 30. Time of day is also provided to the dissemination computer by the clock 35. A storm scope system 36 including lightning detection and means for determining the intensity of a storm are also linked to the computer 30, as is information from a doppler turbulence detector 37.

In the preferred embodiment, the weather radar system 31, airport wind shear detection system 32, storm scope system 36, and doppler turbulence detection system 37 provide data to the dissemination computer 30 via data converters 31a, 32a, 36a, and 37a, respectively. Each of these data converters take the respective sources of information and arrange the information into data packets. Each data packet corresponds to a particular fact. For example, information from the weather radar system 31 would be compressed into data packets defining, as an example, a storm cell of level seven, of diameter three miles, and situated ten miles west of the ATC. The dissemination computer 30 assimilates all the information related to the air traffic and weather within the vicinity of the air traffic control facility. Information from the dissemination computer 30 is transmitted to all receiving aircraft within the vicinity of the transmitter 39.

A second console 38 is provided for an auxiliary personnel to assign an I.D. to a particular target blip displayed on the console 38. The auxiliary personnel can also generate and transmit supplemental information, such as which runways are active at the airport facility.

In the operation of the ground-based system, each traffic target that has been sensed within the vicinity of the ATC facility is automatically assigned a unique binary identifying number. The binary number is unique in that no other traffic in the vicinity of the particular ground facility will be assigned a duplicate number by the dissemination computer 30. This binary identifying number is used by both the air and the ground-based equipment, and is always attached to a particular target for the purpose of tracking that target through the airspace. Only if tracking of a target becomes compromised, for instance, by a failure of the target's transponder, along with the close proximity of primary radar returns from another non-transponding aircraft, would the binary number be reassigned. In this case the ground auxiliary operator at the console 38 receives an automatic alert from the ground computer. If either aircraft is participating, the aircraft crews also receive an automatic alert determined by the airborne computer. As described in more detail herein, a primary responsibility of the auxiliary operator at console 38 is to address discrepancies of this sort, usually by making radio contact with one of the air crews.

Data respecting the traffic in the control space is made known to the extent and precision available from the ground surveillance antennae 21-24. For instance, if a target does not have a transponder, the only information available to the ground-based system, and ultimately available for dissemination to aircraft, is the X-Y position of the target sensed by primary radar. If the target does have a transponder, position information is better, tracking is more reliable, and if the target has mode C, its altitude is available. If surveillance is by satellite or other much more accurate means, provision is included that allows disseminating the more highly accurate and resolute data to air crews.

With the ground-based system of the present invention, the burden on the full performance level air traffic controller is lessened because of the increased involvement by the air crew and their airborne avionics. The auxiliary operator, that uses the console 38, need only have a modest skill and training level since the task of this auxiliary operator is less critical. The primary responsibility of the auxiliary operator is to monitor the aircraft I.D. and ensure the correspondence between the I.D. and the target blip on his console 38. The auxiliary operator would handle failures in aircraft I.D., such as occurs with a transponder failure, and also handle failures of correspondence between position and altitude sensed by the ground-based surveillance equipment and that determined by the target aircraft. Since all aircraft within the controlled airspace are automatically tracked and maintained by the central computer 20 and the dissemination computer 30, it is not necessary for the full performance air traffic controller to handle identification errors. That responsibility can be relegated to the auxiliary operator working at the console 38.

THE DATA TRANSMISSION SIGNAL

Figure 2:
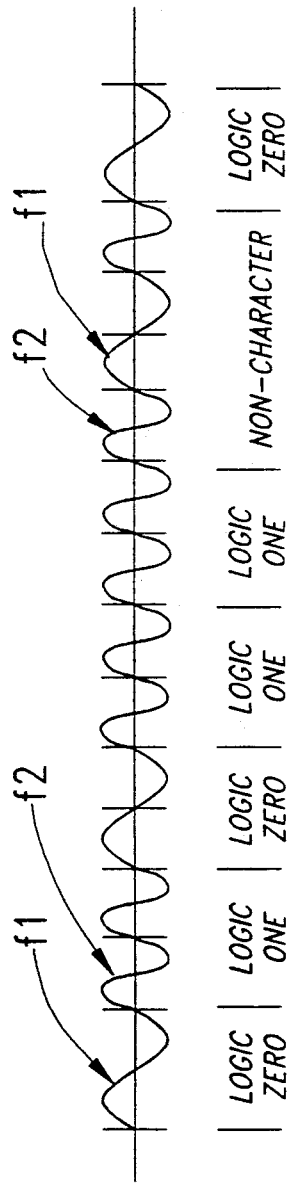
FIG. 2 is a graphical representation of the method of data transmission from the ground-based transmitter of the information dissemination system.

In the preferred embodiment of the present invention, the information collated by the dissemination computer 30 and broadcast by the ground-based transmitter 39 is typically received by a VHF receiver on board the aircraft. The VHF receiver is connected to a standard modem to receive the incoming data. The information disseminated by transmitter 39 is in binary form. In the transmission of traffic and weather data, integrity of the data is important. In order to ensure that transmission errors are quickly and easily detected, a specific modulation scheme, shown in FIG. 2, is utilized in which a single cycle of one frequency (F1) is used to transmit a logic zero (0), and two cycles of a second frequency (F2) are used to transmit a logic one (1). The second frequency F2 is double the first frequency F1. A combination of the two signals F1 and F2 is used to represent a non-character. Thus, as illustrated in FIG. 2, the data transmitted by the modulated signal represents the binary character 01011, followed by a non-character used for data framing, followed by a binary zero.

Figure 3:
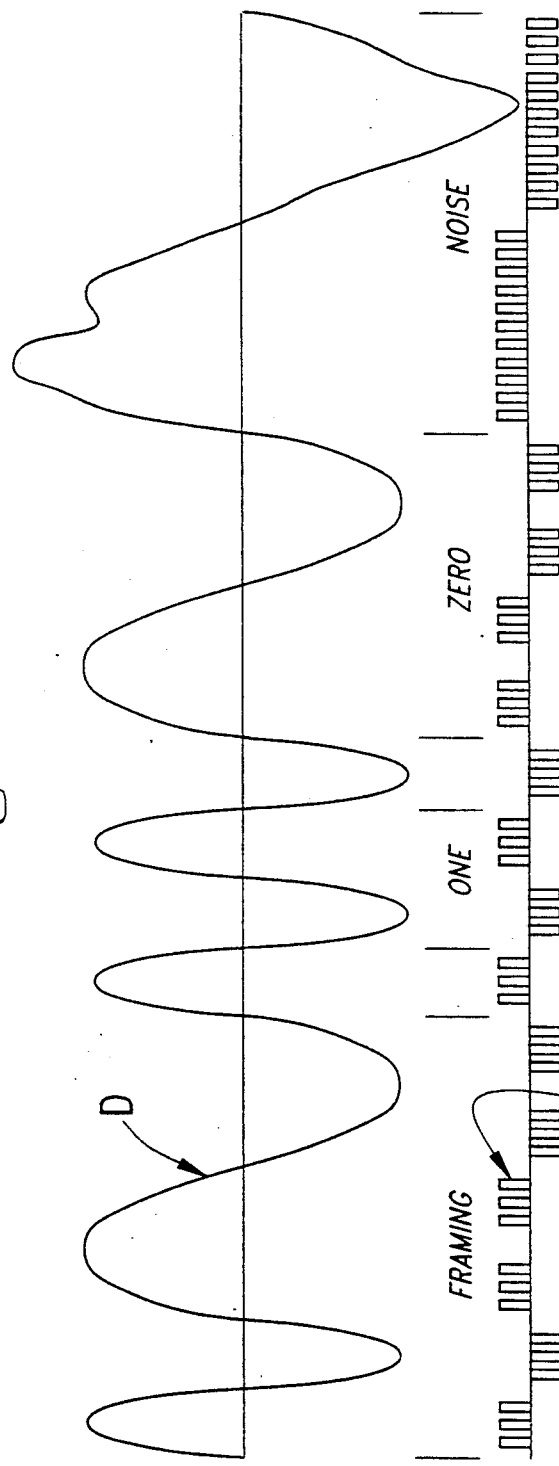
FIG. 3 is a graphical representation of a demodulated signal transmitted from the ground-based system.

Referring to FIG. 3, when the modulated signal D is received by the aircraft on-board modem, the signal is sampled and a voting scheme applied to the sample S to determine if the transmitted data character is logic one, logic zero, a non-character for data framing, or whether noise has interfered. Thus, as shown in FIG. 3, the voting scheme of the modem clearly isolates the framing character, followed by the logic one, followed by a logic zero, and terminated by a noise signal. If noise is detected in a data packet, the packet is ignored. In the case of traffic position data, the occasional loss of a data packet is not very critical since traffic data is repeated every 4–4½ seconds and since a history of target positions is maintained by the airborne computer as described herein. The loss of information due to noise when transmitting weather data is also not critical even though weather data and auxiliary information are not transmitted as frequently as traffic data. Weather information generally will not change as rapidly as traffic position.

Figure 6:
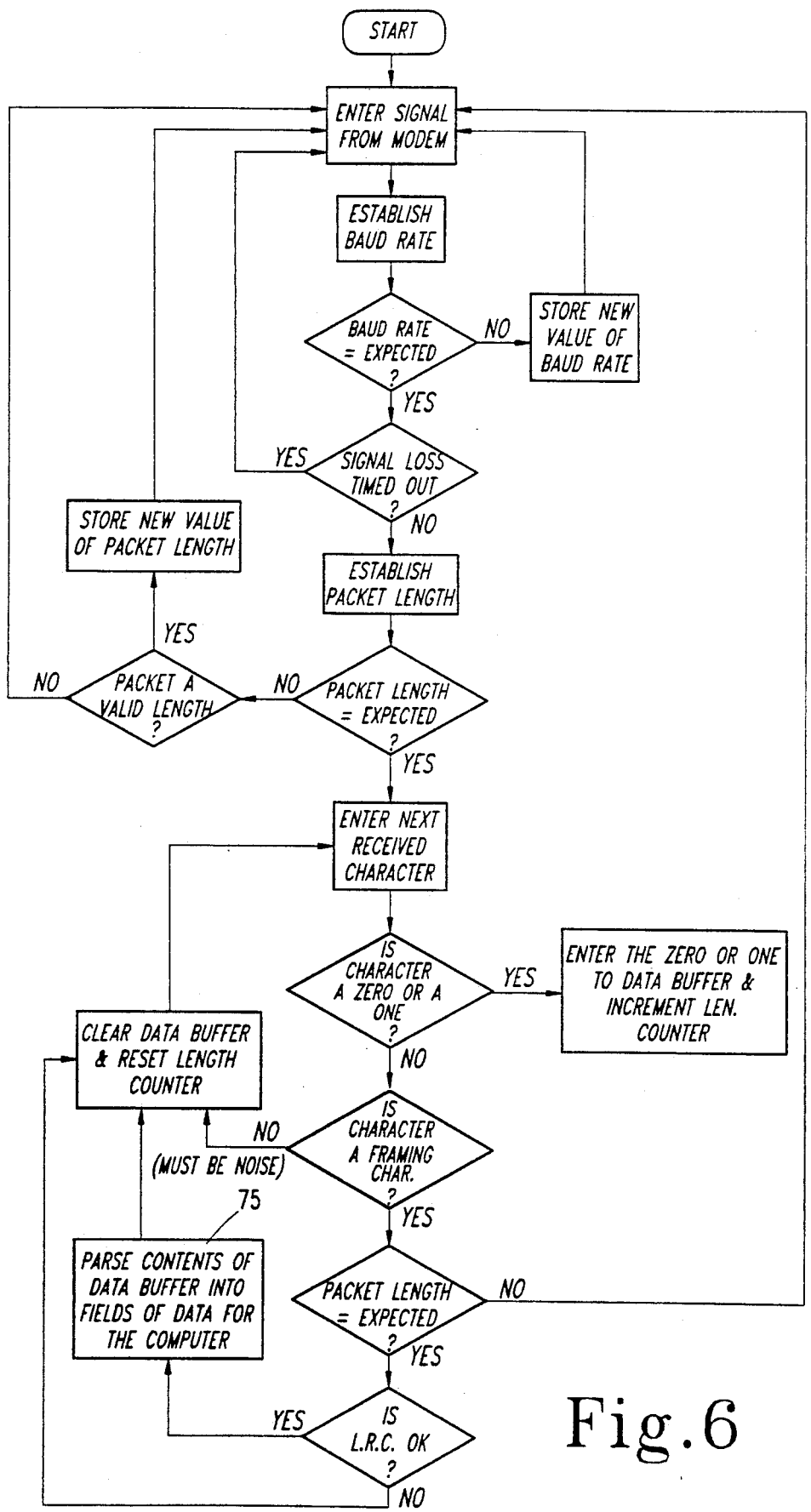
FIG. 6 is a flowchart describing the steps performed by the airborne system in receiving and converting the incoming data signal transmitted by the ground station.

Once the incoming data is demodulated by the aircraft modem, the incoming signal is analyzed as to ones and zeros with packets of data separated by non-characters. When an aircraft first tunes in to an air traffic facility, the incoming data stream is analyzed to determine its baud rate, then non-data characters are located in the data stream to determine the specific packet length. The baud rate and packet length parameters are stored for use for the entire duration that data is received from the particular ATC. Also performed on each packet is an LRC check to ensure the integrity of the data. Once the data packet has been determined to be valid, the fields of information in the packet are parsed into variables for the on-board computer, according to the type of data packet received. This procedure is summarized in the flowchart in FIG. 6.

Typical data packet formats for the preferred embodiment of the present invention are described with reference to FIGS. 4a-4g. In the preferred embodiment, the repetition rate of the data stream is 4 to 4½ seconds, commensurate with the rate at which ATC radar gathers data. Terminal area radar has a 4 to 4½ second sweep time. En-route radar rotates at a rate of 10-12 seconds and sweep a larger coverage area, so data packets from the typical data stream for en-route data are longer.

Figure 4A:
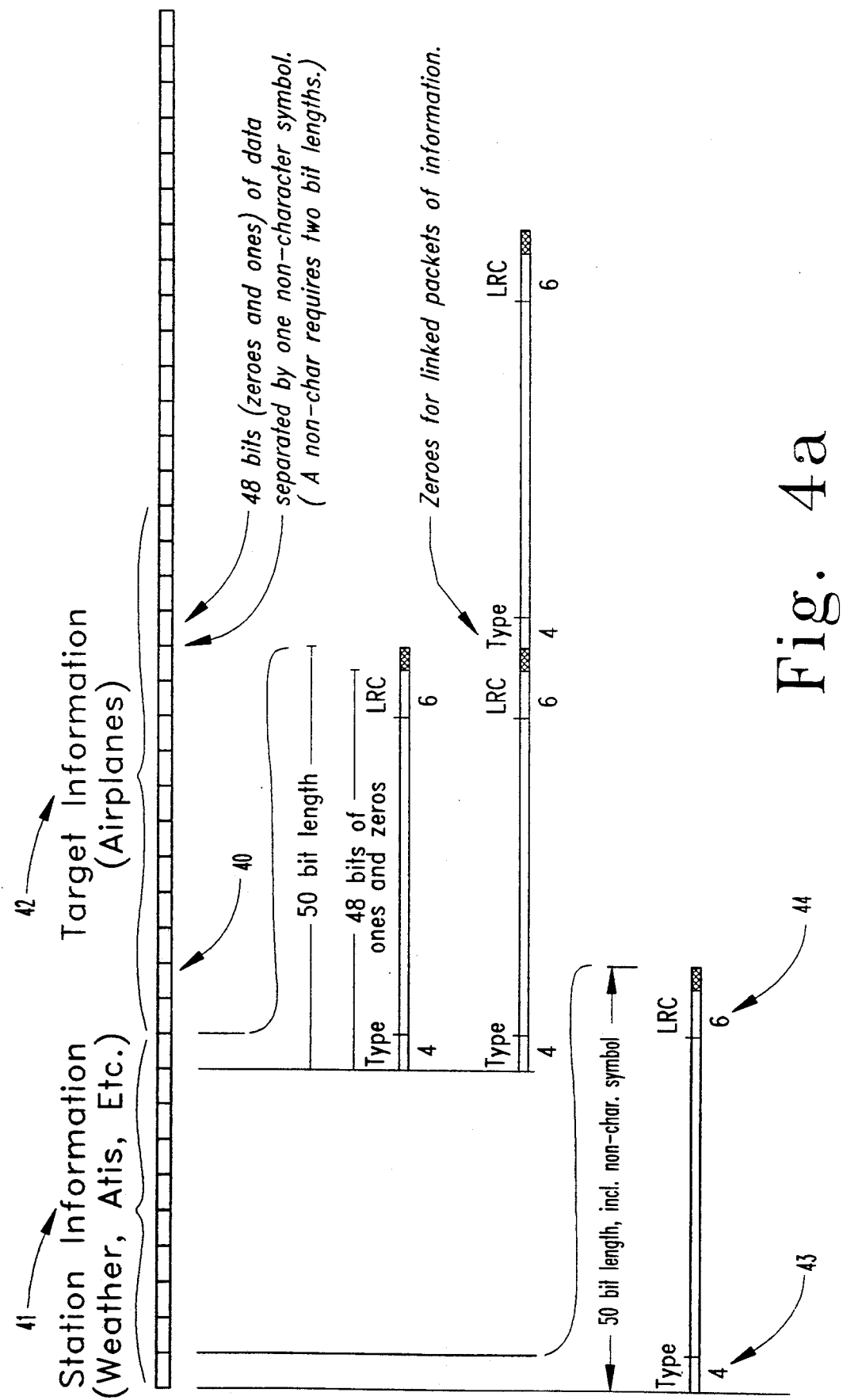
FIG. 4a is a schematic representation of a terminal area data stream.

In the 4-4½ second data stream of ATC data, as shown in FIG. 4a, the first group of data packets corresponds to station information, while the remaining data packets carry target information for the controlled airspace. The station information in the first group of packets 41 may include ATIS information, messages from the air traffic controller, or weather information, for example. Each packet of data in group 41 for station information is of fifty-bit length, including a two-bit length non-character at the end of the packet. The first four bits of the packet define the type of data being transmitted. The last six bits of a data packet constitute an LRC or check-sum used to gauge the integrity of the transmitted data. A similar packet scheme is followed for packets in the target information portion 42 of the data stream.

As indicated, the first four bits of each data packet is available to define up to sixteen general types of data, as shown in the table in FIG. 4b. For instance, zeros in each of the four bits constitutes a message to the computer that the packet is linked to the preceding packet. This linking feature allows for high resolution data to be transmitted, such as would be garnered by satellite position determination systems. A binary one (0001) in the four bits corresponds to ATIS information for the ATC, while a binary two (0010) corresponds to transmitted weather information. The four-bit codes for other types of information are shown in FIG. 4b.

Figure 4C:
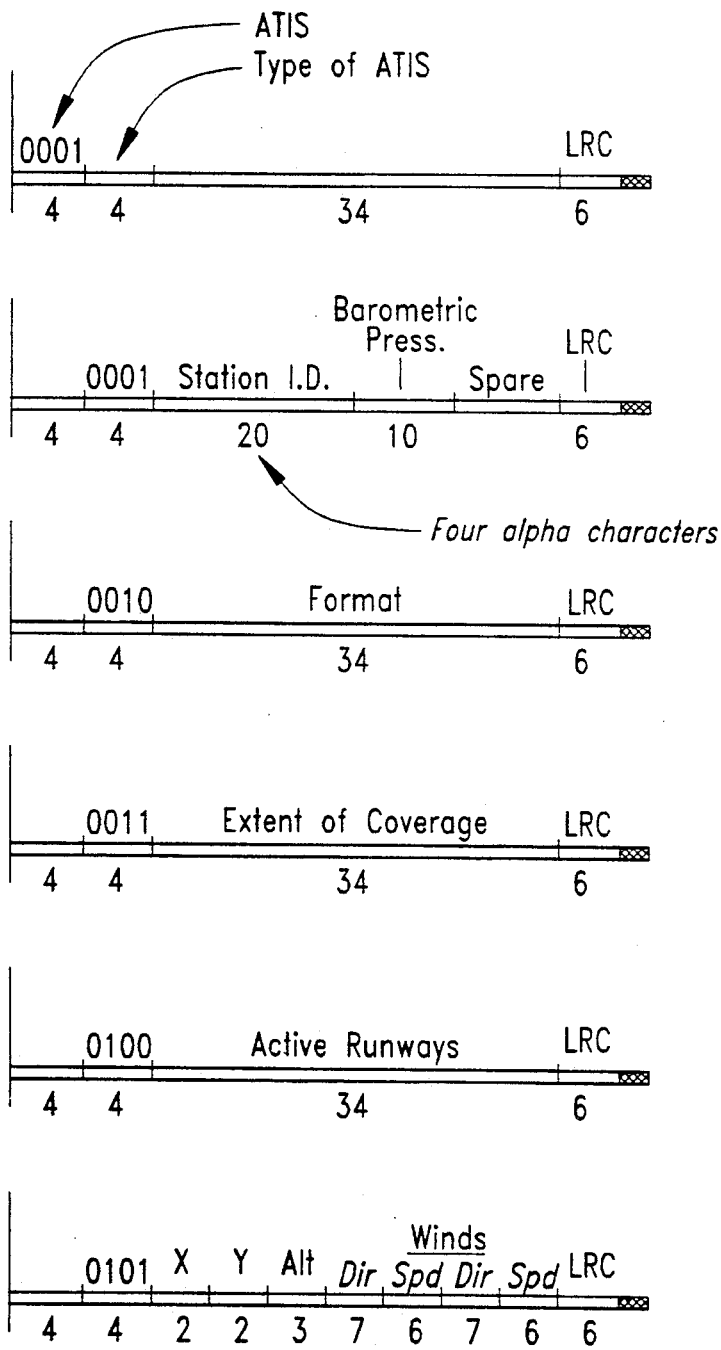
FIG. 4c is a schematic representation of the format of an ATIS data packet.

Data packets containing ATIS information, corresponding to a type code 0001, are illustrated in FIG. 4c. For ATIS packets, following the 0001 general type code is another four-bit code corresponding to the type of ATIS information carried by the data packet. For instance, an ATIS information code of 0001 informs the aircraft on-board computer that the data following will comprise the station I.D., using twenty bits to define four alpha characters, and the station barometric pressure, using the next ten bits. An ATIS information code of 0010 denotes the specification of a special format which allows reference to non-English language characters in use at the ATIS. Other ATIS information codes can be used to specify that the data packet contains information such as extent of coverage, active runways, X-Y (latitude and longitude) position and elevation of the ATC, wind speed and direction at the ATC, and winds aloft at several locations about the ATC.

Figure 4D:
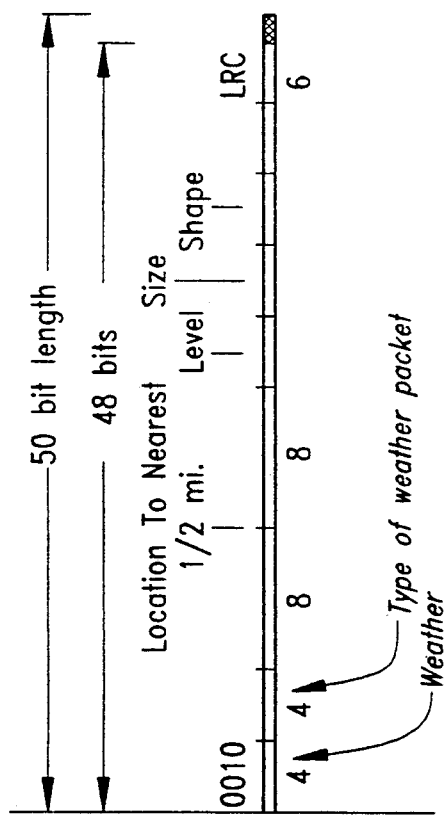
FIG. 4d is a schematic representation of the format of a weather data packet.

The format for a weather or meteorological data packet, identified by a type code 0010, is shown in FIG. 4d. Typically, the meteorological information will include the X and Y location of the particular weather element or condition, as well as the level, size, and shape of the weather element. For instance, a meteorological data packet may include information indicating a level two storm at an X-Y location of two miles and three miles from the ATC, having a diameter of four miles.

Figure 4E:
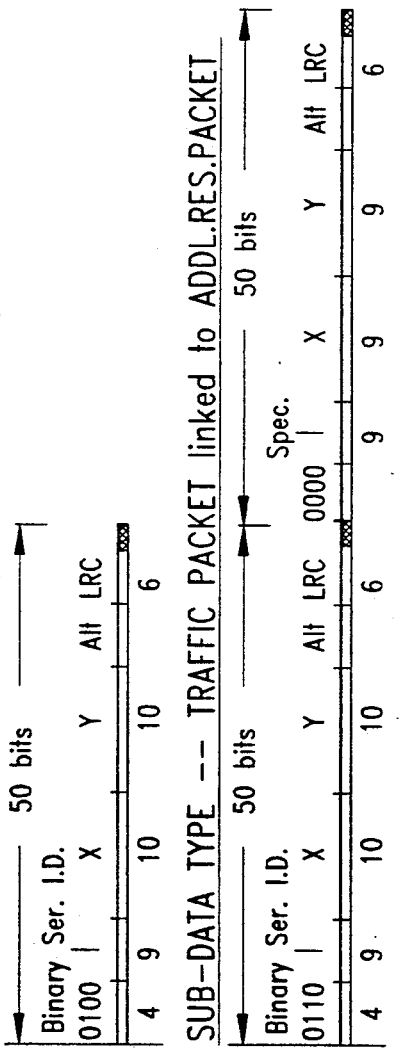
FIG. 4e is a schematic representation of the format of a traffic data packet.
Figure 4F:
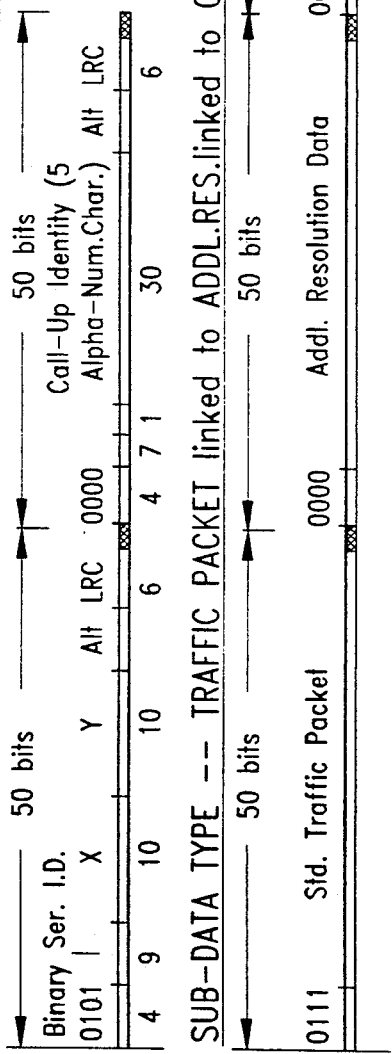
FIG. 4f is a schematic representation of the format of a traffic data packet containing aircraft call-up identity information.

In FIG. 4e, the data packets for traffic or aircraft in the controlled airspace are illustrated. Resolution and accuracy of traffic data corresponds approximately to that obtained by present methods. When additional resolution is obtained, such as through satellite observation, two data packets can be linked using the 0000 type code previously described. With each type of traffic data packet, the nine bits immediately following the general type code corresponds to the binary serial number I.D. automatically assigned by the ground dissemination computer 30. In the preferred embodiment, the X and Y position data relative to the ATC is plus or minus 63 miles to within one eighth of a mile, for the standard resolution traffic information. The altitude is up to 12,000 feet, overlapping the coverage of enroute surveillance. An altitude value of 1111111 is specified if the altitude of the target aircraft is unknown, as might occur when the target aircraft does not have a mode C transponder and the radar surveillance does not have angle of elevation determination capabilities. When the additional resolution information is available, two data packets are linked as previously described. The first packet of traffic information includes the binary serial number I.D. and the X, Y and altitude of the target aircraft in standard resolution. The additional linked data packet includes X, Y and altitude data at higher resolution. In the X, Y, and altitude data fields of the linked packet, the first bit of the X, Y and altitude field specifies whether the additional values are added or subtracted from the X, Y, and altitude data carried in the preceding data packet. Also included in the second data packet is a nine-bit spec field following the first four bits used to link the data packets. The spec field specifies how much of the additional resolution is warranted. The use of higher resolution X, Y and altitude data when the additional accuracy can be verified, allows aircraft to make approaches to outlying airports that do not have an ATC facility, or for helicopters to make approaches to accident scenes, for instance. Satellite surveillance plans include accuracies sufficient that when combined with an on-board terrain data base would allow an approach anywhere on the globe.

Traffic data packets can also carry information specifying a target aircraft's "call-up" identity, for example U443 corresponding to United Airlines Flight 443. In this case, the standard resolution traffic data packet includes a linked data packet in which the first four bits are a binary 0000, and the next seven bits are spare bits. Two of these spare bits may be used in conjunction with the ATIS format statement to specify that the call-up identity is in other than English characters. The next bit following the spare bit specifies that the particular target has contacted the terminal area and is listening on the ATC radio channel. A one in this bit field generates a "plus" ("+") sign preceding the target I.D. on the ground console 39 and on the inflight aircraft displays. Aircraft that have not contacted the terminal area will not have a "+" sign displayed next to its I.D. Thirty bits are provided in the linked data packet for specification of up to five alphanumeric characters for the call-up identity. A similar procedure is followed when additional resolution traffic data is being provided.

Since aircraft are tracked by the binary serial number assigned by the ground-based dissemination computer, it is not necessary for the subject aircraft to see the call-up identities to have advisories or alerts activated by these aircraft. Thus, the call-up identity information need not be supplied by the ground dissemination computer 30 more often than every thirty seconds. On both the ground-based and on-board portions of the system, a correlation is maintained between the call-up identity for target aircraft, and the corresponding assigned binary serial number.

Figure 4G:
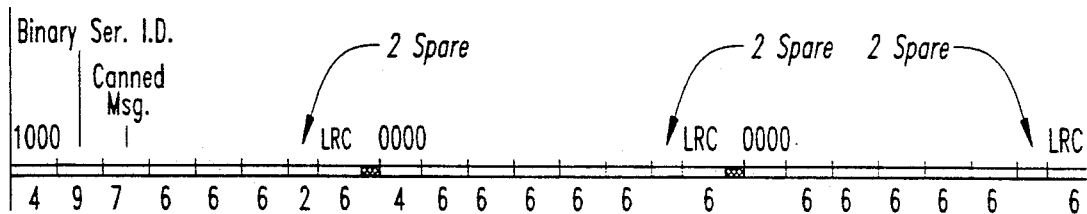
FIG. 4g is a schematic representation of the format of an ATC message data packet.

Another use for linked data packets is illustrated in FIG. 4g corresponding to ATC messages transmitted to a particular target aircraft. Following the type identification field is the binary serial number I.D. corresponding to the particular target aircraft. The next seven bits are provided to identify up to 127 standard messages, such as "CLEARED TO LAND", or other frequently used messages that today are provided by verbal communication. The on-board computer would include each of these 127 canned messages in memory accessible by the seven-bit canned message I.D. Following the canned message identification field are a number of six-bit alphanumeric character fields. Data packets can be linked as required to allow additional alphanumeric characters to be transmitted. Each linked data packet includes six six-bit alphanumeric character fields to accommodate a variety of advisory messages that may be disseminated by the air traffic controller or by the auxiliary personnel at the ground station.

THE AIRBORNE SYSTEM

Figure 5:
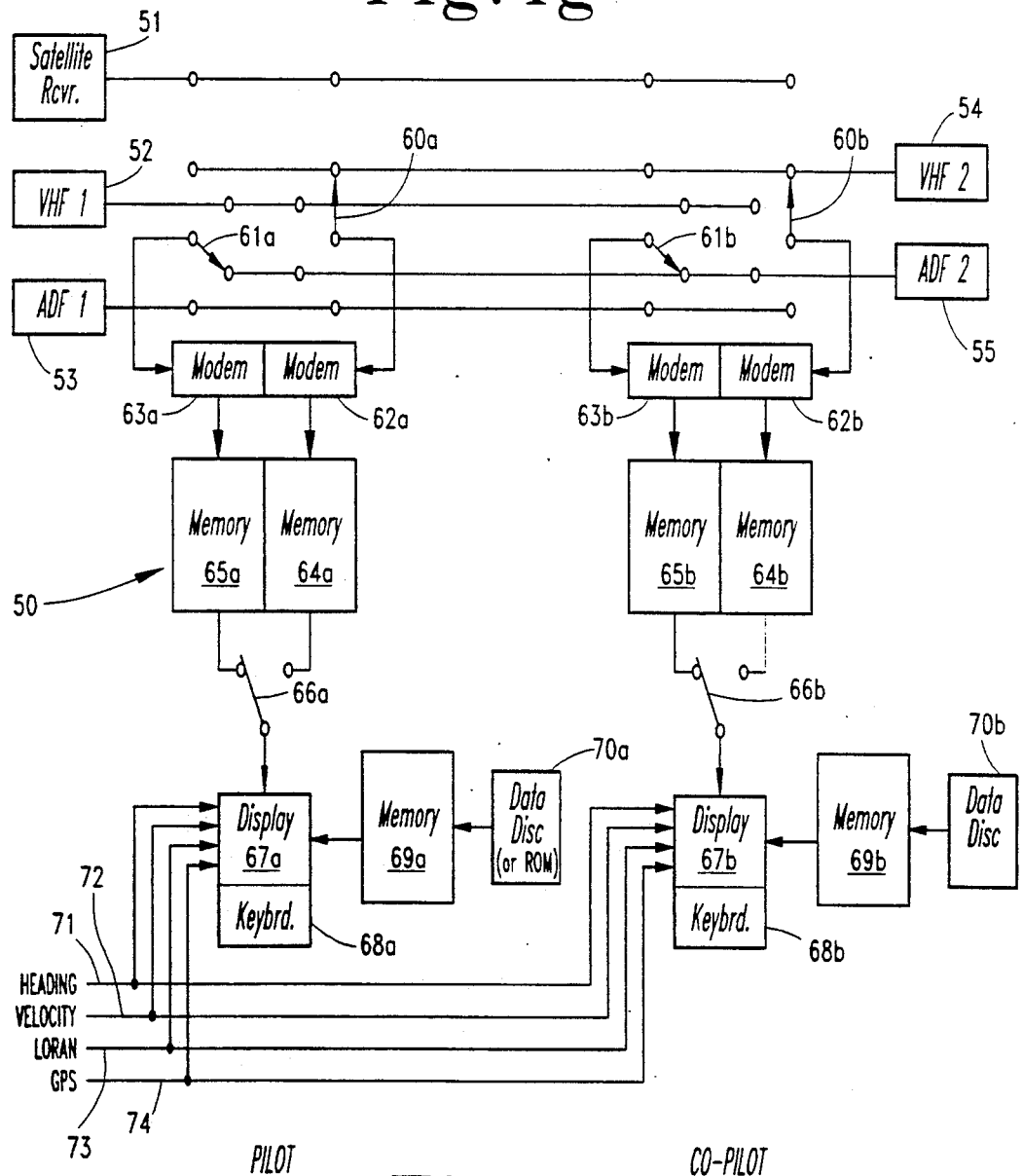
FIG. 5 is a block diagram of the airborne information display system for use in the preferred embodiment of the invention.

The several components comprising the airborne portion of the system of the present invention are described with reference to FIG. 5. The airborne system described in the preferred embodiment is a dual system shown with a variety of receivers as would be expected to be found on commercial jetliners. It is understood, however, that this system can be easily and inexpensively adapted for use in general aviation aircraft. As described below, the airborne on-board system is duplicated between the pilot and copilot, with the pilot components having a suffix "a" for each element of the system and for the copilot a suffix "b". For simplicity in the following description, the suffixes will be dropped and each of the elements of the airborne system identified by its element number. It is understood, of course, that the element are identical between the pilot and copilot systems.

The aircraft in the preferred embodiment is equipped with various means of receiving data, including satellite receiver 51 and ADF receivers 53 and 55 typical in most commercial aircraft. These various communications receivers can be tuned to the departing, enroute or destination terminal stations. In the preferred embodiment, a switch 60 can be used to switch between receivers 52 and 54, or 53 and 55. The switches determine which modem is providing data to the demodulators 62 and 63. Each modem 62 and 63 performs the demodulation and parsing functions previously described.

Each modem 62 and 63 is linked to a corresponding memory 64 and 65 to receive the data packets output by the modems. The dual modem and memory provisions allow the aircraft crew to tune ahead to the destination terminal station to receive ATIS, weather and traffic information. Thus, in the preferred embodiment, VHF1 receiver 52 and ADF1 receiver 53 can be tuned to the departure terminal station and ATIS weather and traffic information can be received from the departure terminal station, pass through modem 62, and be stored in memory 64. Similarly, data from the destination station received through VHF2 receiver 54 and ADF2 receiver 55 can be demodulated in modem 63 and stored in memory 65. A switch 66 is used by the aircraft crew to switch between the departure and destination terminal station memories 64 and 65, respectively, for display on the airborne display 67. When switch 66 is changed, there is no delay in changing the information on display 67 since the data from the destination terminal station is already stored in memory 65.

For the typical airline operation, working with ATC to establish identities is relatively simpler than for general aviation aircraft due to information sharing between facilities. Thus, an airline flight with a given flight number departing and arriving at a number of airports would only need to go thru an identity correspondence once with ATC. Up to five alphanumeric characters would define the flight's identity. These would be keyed into the airborne system by the crew and into the ATC computer by ground personnel at the flight's initiation when the transponder code, etc. was agreed upon.

However, the process is more involved for a typical general aviation operation where the flight departs a smaller airport and after a flight of 60 or 70 miles operates into a major air facility. As the aircraft climbs from its departure point, it enters airspace that allows tuning into VHF communications occurring at the major facility. Tuning this system into the data dissemination channel causes the airborne system to begin storing data as received from the major center, once the modem has determined the baud rate and packet length. Within seconds, the display begins to show information, but with the major air facility at the center of the display and with north being toward the top of the screen.

If the subject aircraft carries an operating transponder, the major facility's surveillance will probably have already picked up the general aviation aircraft, after which the ATC computer assigns a nine bit binary serial identity to the aircraft that both ground and airborne equipment will use. It then incorporates into the data stream a packet of data corresponding to the aircraft, consisting of the binary identification number, position in X and Y, and altitude if the aircraft is transponding mode C. The binary number is the electronic "handle" that is part of the tracking algorithm that tracks the flight of the subject aircraft all the way to shut down at the major airfield. The collision alert algorithms in all other aircraft carrying the system are aware of the presence of the subject aircraft just as soon as ATC has started disseminating surveillance responses.

The ATC at the major facility can be called up at any time and the ATC identifies the blip corresponding to the subject aircraft on radar using conventional means, including assignment of another transponder code. etc. For a general aviation aircraft. the "56 Tango" identity is entered into the ground computers by ATC. Occasional packets are added to the data stream linking the alphanumeric i.d. with the binary serial number of the subject aircraft. Other aircraft displays will now show this identification number, and can call the subject aircraft on the radio using the "56 Tango" identity if they wish.

The airborne system has means, such as a keypad 68*a*, to enter the "56 Tango" identity to the airborne system. (The binary serial number could be transmitted verbally by the auxiliary operator to the flight crew who may then enter the number via the keyboard 68*a*). Generally, the binary serial number is automatically obtained by the airborne system if an alphanumeric identification or transponder code is known by the ground station. In this instance, the binary and alphanumeric identifiers can be transmitted by the ground station in a data packet similar to the packet shown in FIG. 4*f*. The airborne system then looks for a data packet carrying the alphanumeric identification to obtain the corresponding ground-assigned binary serial number.

When the airborne system sees a data packet correlating this identity with the binary serial number, the display becomes egocentric. At this point, the airborne system can begin determining traffic advisories, alerts, weather cell threats, terrain information for the area, etc., all in proper direction and distance from the subject aircraft's position, shown at the screen's center. If the aircraft has a map data disk as part of its equipment, the pilot can now call up moving map displays.

Human error may occur during this process, such as a failure of ground personnel to identify the subject aircraft with the proper blip on the radar scope. In this case, the egocentric airborne display of the subject craft will not correspond with surroundings and features as observed by the crew. Also, ground speed and ground track calculations done by the airborne system will not correspond with the heading and velocity inputs from the aircraft instrumentation. An alert can be sounded and the crew can call ATC to notify ground personnel of the problem. With current procedures, this type of error leads to harsh consequences because ATC may be talking and giving instructions to the wrong blip, with the airborne crew unaware that a mistake had been made.

If the subject aircraft has an inoperative transponder, it will likely have to fly higher or wait until it is closer to the ATC before primary radar surveillance is reliable enough to track the aircraft. In any case, at that point the call-in procedure is the same. Also, without supplying ATC with the altitude, the best the subject aircraft's traffic advisory and collision alert portion of his system can do is make position threat calculations without allowing for vertical separation.

Since primary radar typically does not guarantee surveillance at an unlimited distance from the center, the ATC can supply an envelope within which coverage is guaranteed. If the departure airport described above is outside of this envelope, the TRAFFIC message, described elsewhere, will not be green until the flight is within this envelope. Until that time, the subject flight will have to maintain VFR for any non-transponder equipped aircraft.

As data is received from the dissemination system, it is stored in memory. The portion of the data stream that corresponds to the subject aircraft is stored away separately. The formats of the data storage structures and the algorithms that operate on the data are described herein.

Referring again to FIG. 5, the computer and display 67 also receives data from the aircraft instrumentation, such as the aircraft heading at input 71, and aircraft velocity at input 72. The heading data is provided to the display to allow orientation of the display corresponding to the direction of travel of the subject aircraft. The velocity input allows a cross-check of the ground speed calculation performed on data received from the ATC. A velocity sensor on one of the landing gear provides accurate low velocity indication utilized by the runway and taxiway moving map display at airports. Optional navigation inputs from Loran-73 or GPS-74 can be used to cross-check the X-Y position and altitude data transmitted from the ground station. Discrepancies between the ATC transmitted position data and the navigational aid Loran or GPS position data can suggest that ATC personnel assigned the call-up identification for the subject aircraft to the wrong blip on his display. Discrepancies of this nature immediately alert the aircraft crew to a potential problem, who then can contact the ground-based auxiliary operator to correct the problem.

An additional memory 69 is fed to the computer display 67. The memory 69 is used to store information read into it from a data disk 70. The data disk 70 can contain a wide variety of "static" information—that is, information that changes infrequently, if at all. For instance, the data disk 70 can include data concerning the terrain or structures surrounding a particular ATC facility or airport, or data concerning the location of cities or ADF/VORTAC facilities surrounding a particular ATC. Information stored on data disk in the airborne system may be undated by the ground station through a data stream of the type shown in FIG. 4*b*, including information concerning a temporary airspace restriction or a new television transmitter tower, for instance. The disk may also include a graphic display of the airport facility associated with a particular ATC, on which runways and taxiways, etc., are displayed and identified, and information concerning airways, airspace boundaries, approach plates, etc.

A primary use for the data disk is as a moving map display that includes data fed into the memory 69. The computer display 67 receives the information contained in the memory 69 and manipulates the moving map data relative to the X-Y position data for the subject aircraft. Thus, the moving map information provided by the data disk 70 is properly integrated with the real time information displayed on the computer display 67 in the egocentric manner. The memory 69, or the data disk 70, can also include a look-up table for canned messages typically disseminated by an ATC facility, such as "CLEARED FOR TAKE-OFF", etc., for which the format is shown in FIG. 4*g*.

THE AIRBORNE SCREEN DISPLAY

Figure 7:
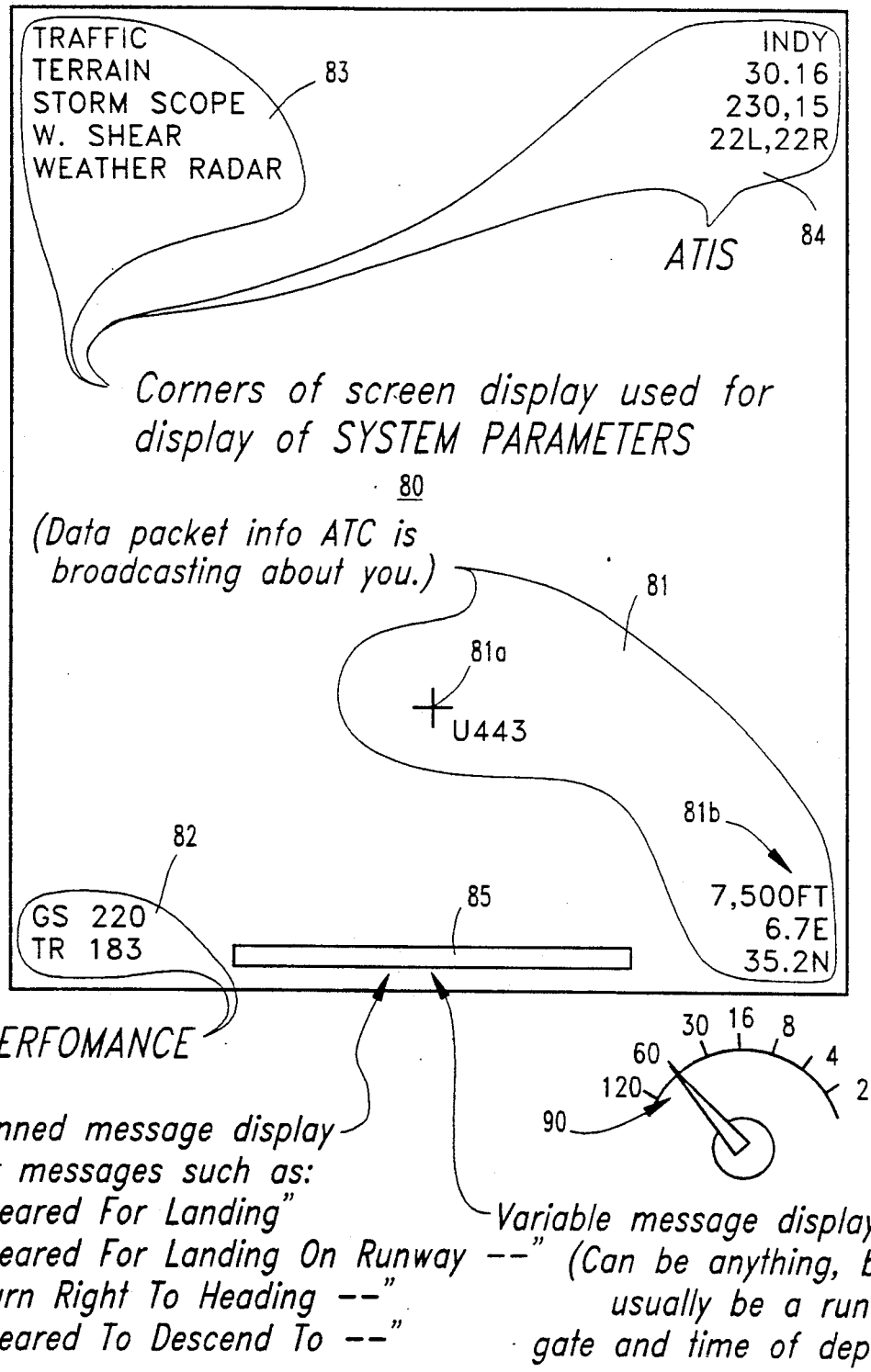
FIG. 7a is a representation of a display on the airborne display screen including alphanumeric information display regions.
FIG. 7b is a representation of another display at a 60 mile range including positions of aircraft within the ATC and moving map information corresponding to the location of airport facilities.

Attention is now directed to FIG. 7*a* in which the airborne screen display is illustrated as it would appear on computer display 67. The display field 80 of the airborne computer display is divided generally into five regions of information. Information on the subject aircraft is displayed in region 81 which translates the data packet information broadcast by the ATC about the subject aircraft. Included in this display is the symbol 81*a* adjacent the call-up identity of the subject aircraft, in this case United Airlines Flight 443 or U443. Also included in region 81 at location 81b is the altitude and X-Y location of the subject aircraft relative to the particular ATC. The ground speed and track of the subject aircraft is displayed in region 82. This information is calculated from the successive positions of the subject aircraft received via the data stream.

In region 83, the information dissemination system parameters are displayed indicative of whether data for particular features of the system is being supplied. In the preferred embodiment, an alphanumeric display of the system features is shown in region 83 in a steady green if these features are activated. For instance, region 83 may contain the words "TRAFFIC", "TERRAIN", "STORM SCOPE", "WEATHER RADAR", and "WIND SHEAR", as an indication that these system features are being provided by the ground-based system. If the word TRAFFIC is displayed in steady green, the subject aicraft is within the envelope of station coverage, including primary radar surveillance. Display of the word TERRAIN in steady green means that the airborne memory 69 includes terrain and map and associated with the particular terminal area station. Illumination of the words STORM SCOPE, WEATHER RADAR, or WIND SHEAR, means that this data is being supplied by the particular ATC, even if no weather is present.

In the event that the subject aircraft is outside the envelope of traffic coverage provided by the ATC, the word TRAFFIC appears in red. An audible alert is sounded if the word TRAFFIC changes from green to red indicating that the subject aircraft is outbound and leaving the particular ATC coverage envelope. Any of the remaining words in region 83 appearing in red is an indication that this information is not available either from the on-board data disk or from the ground-based system. Alternatively, the region 83 can include a display of only those system features available from the ATC or airborne system.

ATIS information is displayed in region 84 of the display field 80. This information includes the four character identity of the ATC facility that the subject aircraft is tuned into, along with the barometric pressure, wind direction and speed, and active runways for that facility. The final display region 85 at the lower edge of the screen is reserved for alphanumeric display of canned messages or variable messages sent by the ground air traffic controller or auxiliary operator. The canned messages can include messages, such as "CLEARED FOR LANDING", "CLEARED FOR LANDING ON RUNWAY_", "TURN RIGHT TO HEADING_", or "CLEARED TO DESCEND TO_". Immediately adjacent the canned message display is the variable message display that can include the runway number, heading or altitude corresponding to certain of the canned messages. The variable message display can also be used to display any text message that may be generated by the ATC personnel.

The computer display 67 includes a range selection dial 90 beneath the screen display 80. The range on the selector 90 represents the distance measured between the current position of the subject aircraft, in this case U443, and the top of the screen. In the preferred embodiment, the range can be changed between 2-120 miles.

Additionally, the computer display 67 includes a keypad 68 (FIG. 5) used for entering a flight number or aircraft i.d., a selector dial (not shown) for allowing crew selection of information to be displayed, and push buttons (not shown) allowing quick recall of a prior selection of screen display. This allows maximum selection of features by feel without fumbling around on a keyboard and losing a key display at an inopportune time.

Figure 7B:
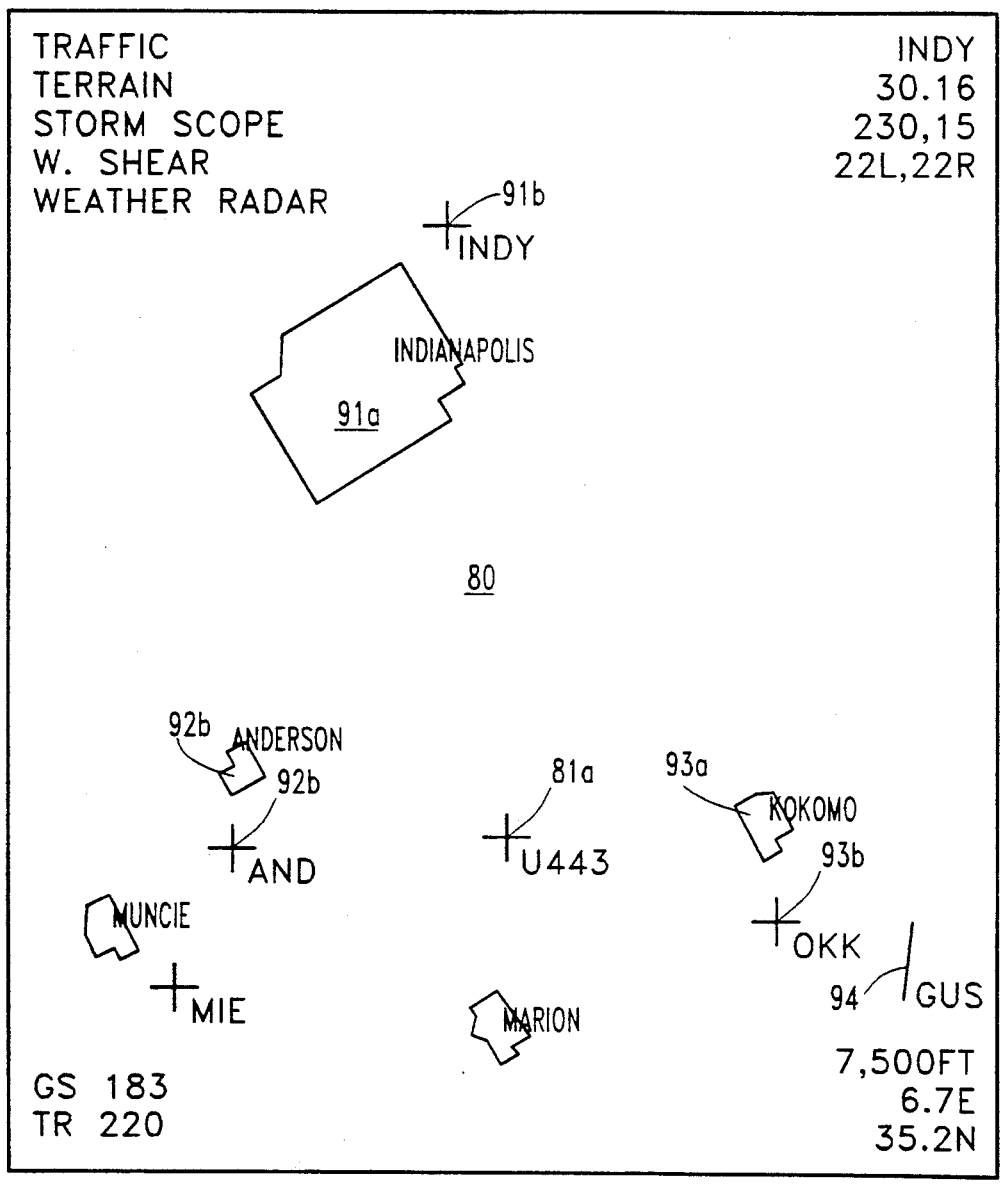

By way of example, the display 80 shown in FIG. 7b at a range of 60 miles is for a section of Indiana north of the region around Indianapolis, and, in particular, the Indianapolis International Airport. (The display regions 81b and 82-85 are not shown in FIG. 7b for clarity. In normal circumstances, these regions would be constantly visible on the display field 80.) A map disk, such as data disk 70, has provided data to the memory 69 concerning the location of cities and other airports about the Indianapolis Airport. This map information is fed into the computer display 67 and appears as a moving map display according to the location, heading, and velocity of the subject aircraft U443, as well as the range selected on dial 90. Thus, the outlines of the city of Indianapolis 91a and the orientation of the runways at Indianapolis International Airport 91b appear on the display. Other cities and their associated airports appear at Anderson 92a and 92b, and Kokomo 93a and 93b, for instance. A separate runway 94 at Grissom Air Force Base, designated Gus, also appears on the screen. It should be noted that the subject aircraft U443 is traveling in a southwesterly direction on a heading of 220° C. toward the Indianapolis center, Indy 91b. With the egocentric display feature of the present invention, the orientation of the display is determined with the top of the screen corresponding to the heading of the subject aircraft.

In the preferred embodiment of the present system, if the subject aircraft is tuned to a particular ATC displayed on the moving map display, that ATC is highlighted on the screen. Thus, in FIG. 7b, if the subject aircraft U443 is tuned to the Indianapolis center at Indy 91b, the Indy center is highlighted on the screen. If, however, aircraft U443 is tuned to another ATC outside of the display range on the display field 80, the Indy facility 91b will appear with the same intensity as all the other airports and facilities in the display field.

Figure 8:
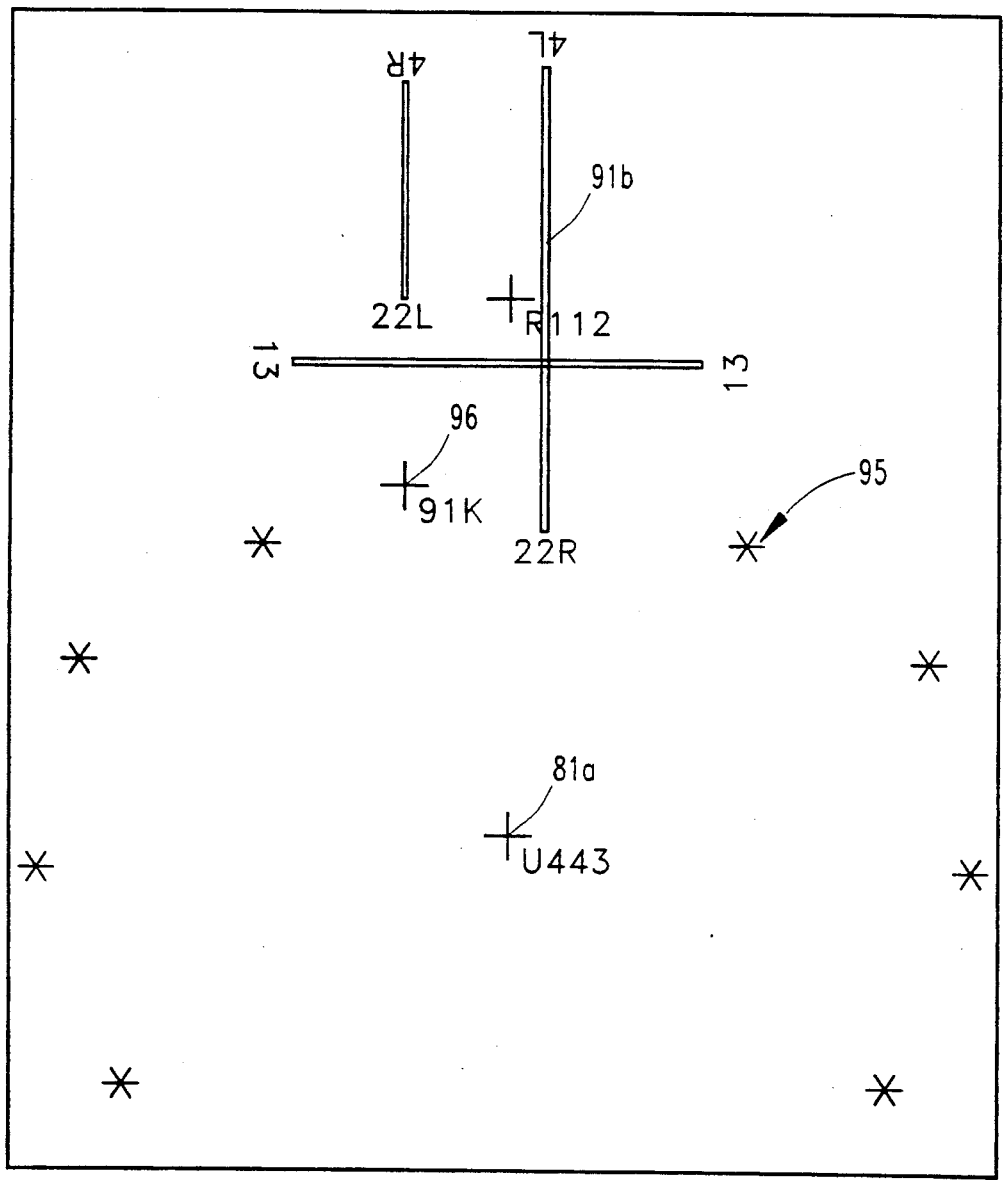
FIG. 8 is a representation of a display at a four mile range with the subject aircraft approaching an airport.

As the subject aircraft U443 approaches the Indianapolis center at Indy 91b, the on-screen resolution of the moving map display can be enhanced. In FIG. 8, the range selector 90 has been adjusted to a four mile range. The three runways at Indianapolis center 91b are shown in more detail at this range. In FIG. 8, with the range of four miles selected, a two mile range direction rose 95 is shown surrounding the subject aircraft U443. The direction rose 95 is also meaningful to the flight crew at eight and sixteen mile ranges and can also be displayed on the screen when the range selector 90 has been so set. It can be noted that the runway designations (e.g. 4R, 22L, 4L, and 22R) are displayed as they would appear when actually viewed from the subject aircraft.

As the heading of aircraft U443 changes, the Indianapolis center display 91b will rotate relative to the subject aircraft 81a but the display of the runway designations will maintain the same relationship to the runways as is shown in FIG. 8, and as appears to a pilot in real life. In the preferred embodiment of this invention, active runways are highlighted in the night color lighting scheme by the ground auxiliary operator when it has indicated to the system which runways are active. Thus, the approach end of the active runway will have a green color on the screen while the departure end of the runway will have a red color. If an aircraft is approaching a runway from the wrong end, the coloring of the runway image on his screen alerts him to the error. Also shown on the display illustrated in FIG. 8 is another aircraft carrying the call-up designation "91K", identified by the symbol 96.

Figure 9:
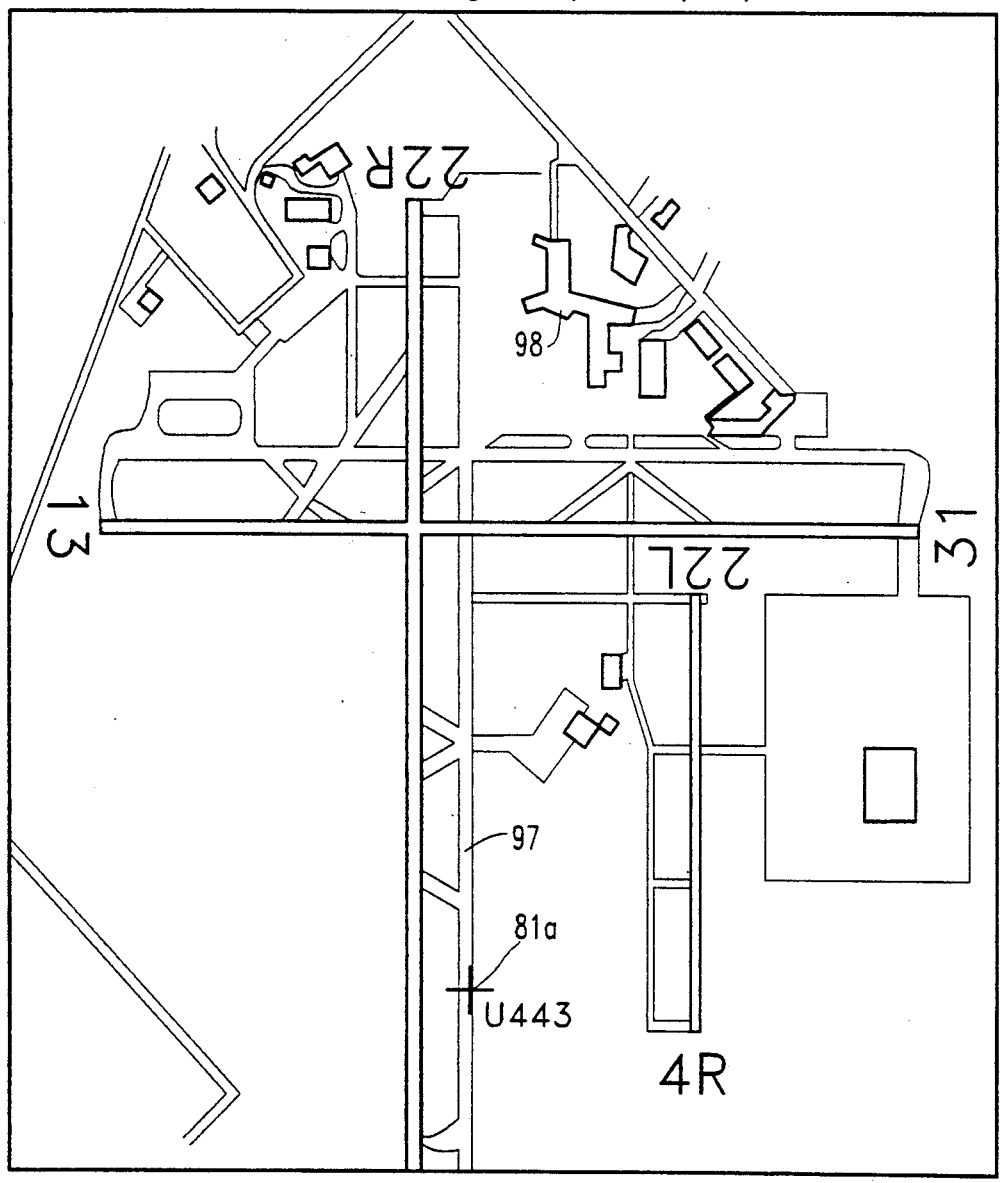
FIG. 9 is a representation of a display of the subject aircraft after landing at the airport, with the display at a two mile range and showing moving map information illustrative of the airport facility.

In FIG. 9, the range selector 90 has been switched to a two mile range, and the subject aircraft 81a flight U443 is shown taxiing along taxiway 97 back toward the terminal area 98, after having landed on runway 22R. Thus, the moving map display is reoriented for an egocentric display according to the heading of aircraft U443 down the taxiway, which is different from the heading of the aircraft while on approach to runway 22R as shown in FIG. 8. If runway 13/31 has become active since the landing of aircraft U443, its color scheme will inform the flight crew. It should be noted that even with this detailed display with a two mile range, the presence of other target aircraft within the two mile range would be displayed on the screen in FIG. 9. The aircraft's computer combines information from ATC surveillance with the aircraft instrumentation's data (such as the low velocity measurement) to calculate its position on the airport so the moving map retains accuracy. Once an aircraft is parked in the terminal area it can be "signed off" by mutual action of ATC and turning off the aircraft transponder by the crew. The target aircraft is then no longer displayed on other aircraft's screens.

Figure 10:
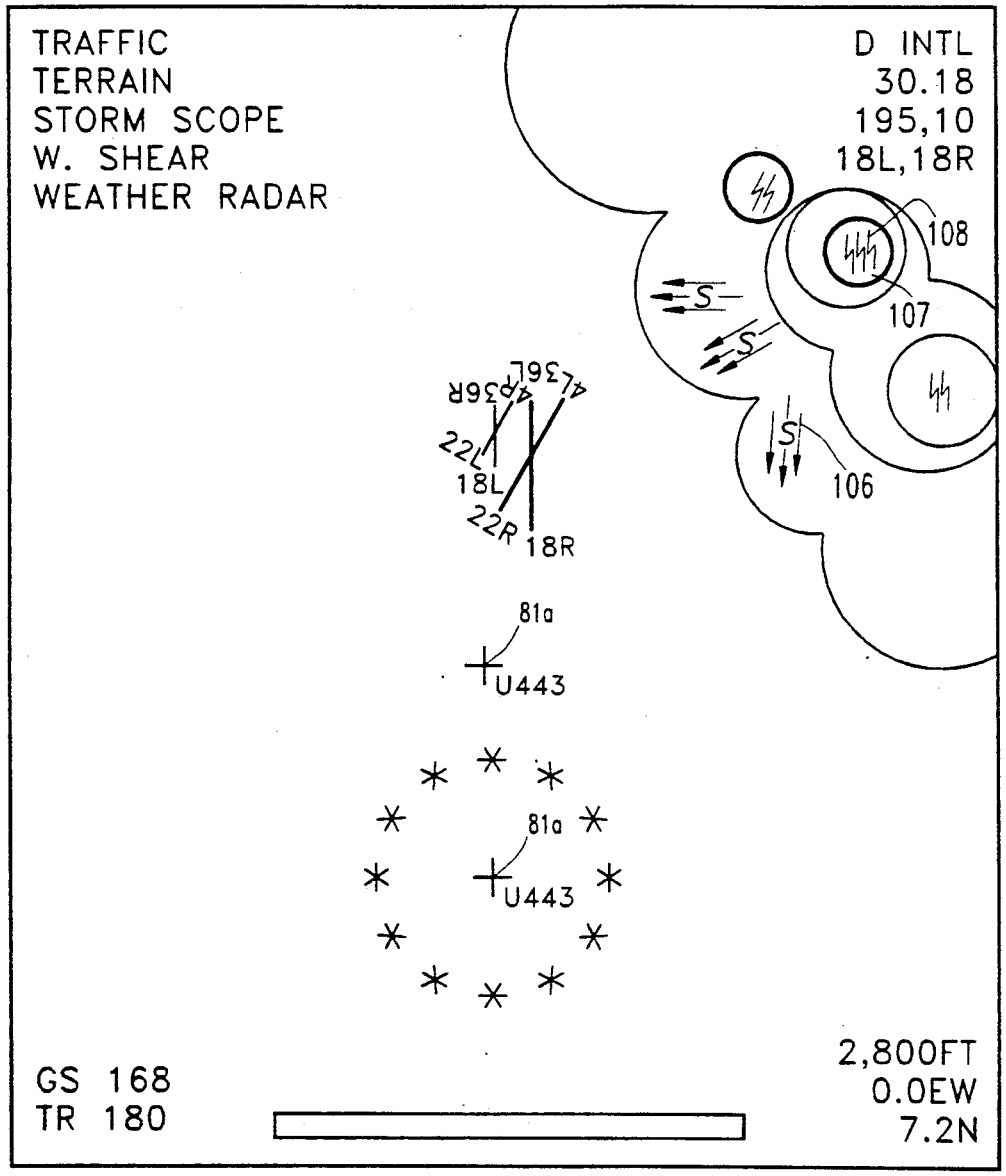
FIG. 10 is a representation of another display feature on the display screen including aircraft position, static features and meteorological conditions.

FIG. 10 illustrates a screen display in which weather patterns are also displayed on the screen. The subject aircraft U443 is shown on the screen, along with a target aircraft 100, carrying the designation A114. An airport 101 is also shown on the screen. Based on data provided by the ATC at airport 101 weather information is displayed, such as weather front 105. Wind shear is displayed as shown at location 106, and storm cell information is shown at location 107. The intensity of the storm cell is signified by standard color schemes, with red denoting a high intensity storm cell. The presence of lighting strikes in storm cell 107 are also indicated by the lightning bolt figures 108. As the weather conditions change, the storm front 105, wind shear 106 and storm cell 107 are updated by the ground station and changed on the display. Since most weather conditions do not change as rapidly as aircraft positions within the controlled airspace, there is no need to transmit all weather data with every 4–4½ second transmission of data. Transmission of weather information updates are as frequent as every 4½ seconds if needed, such as for wind shear, or as infrequent as once every 30 seconds. It is understood that moving map data, such as that shown in FIGS. 7a–7b, can also be included on the display of FIG. 10 to give a comprehensive information display for the flight crew of aircraft U443.

AIR TRAFFIC CONTROL AND COLLISION ALERT

Figure 11:
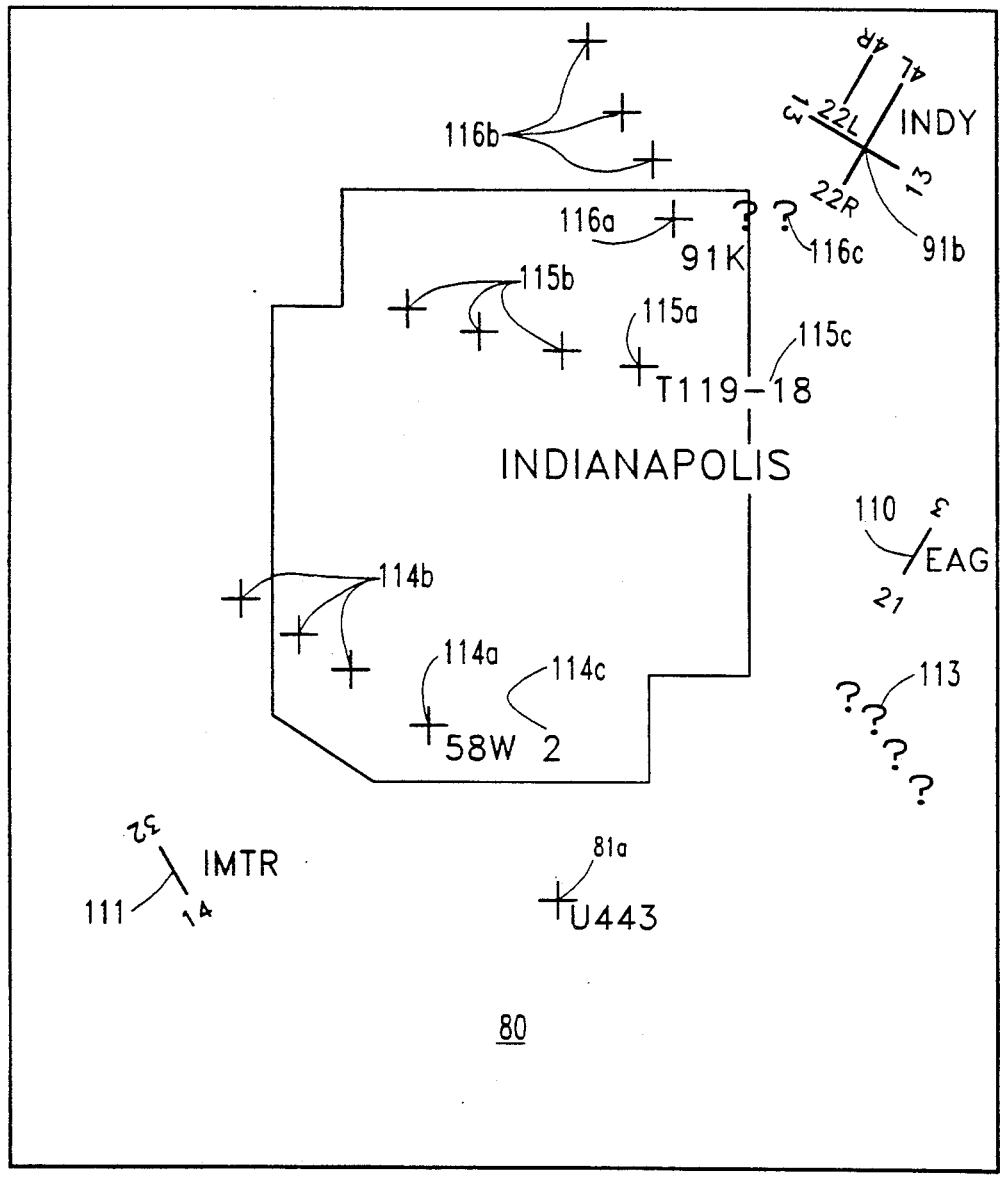
FIG. 11 is a representation of another display in which the tracks of other aircraft are shown relative to the subject aircraft.

The airborne screen display illustrated in FIG. 11 shows a typical display within a controlled airspace about an airport facility involving several target aircraft. The subject aircraft 81a, or flight U443, has selected a range of sixteen miles on the range selector 90, and is headed for the Indianapolis Airport 91b. Data in memory 69 from map data disk 70 accounts for the display of the outlying airports 110 and 111 and other details surrounding the Indy ATC.

The on-board display illustrated in FIG. 11 shows four targets in addition to the subject aircraft flight U443. The position of a target 113 is designated by a question mark ("?") because only a primary radar return is available on this target aircraft and because the target 113 has not been identified to the Indy ATC. Target aircraft 113 will precipitate collision alerts on other aircraft's systems, if warranted. (When altitude is unknown, other aircraft's alerts are based on position only, which means that advisories or alerts may occur even though there is adequate vertical separation to avoid a collision).

A second target aircraft 114a has the call-up identity 58W corresponding to a private aircraft. Immediately adjacent the call-up identity is a field 114c in which the number 2 is displayed, corresponding to the altitude of the target aircraft 114a in hundreds of feet above or below the altitude of the subject aircraft. The presence of the "+" sign to designate the position of target aircraft 114a indicates that the crew of the target aircraft is participating in the air traffic control system around Indy ATC—that is, the target aircraft is talking to the same control facility as the subject aircraft U443. The additional "+" symbols 114b are used to illustrate the track or flight path of the target aircraft 114a. With this track information, the crew of the subject aircraft flight U443 has an instantaneous visual indication of the heading of target aircraft within the vicinity of the subject aircraft, as well as a rough idea of the velocity of the target aircraft as indicated by the spacing between the "+" symbols in the track 114b. The display shown in FIG. 11 shows four symbols 114b to represent the target aircraft track, although more symbols can be provided where more position data history is available. In addition, the symbol 114b corresponding to the most recent position of the target aircraft may be replaced by an arrow showing the direction of travel of the target aircraft, or may even be a symbolic representation of the aircraft itself so that the flight crew of the subject aircraft has an immediate indication of the heading and type of the target aircraft. This additional information dissemination is facilitated by the system enhancement and expansion packets illustrated in FIG. 4d.

Another target 115a with its tracks 115b and its altitude 115c shown as 1,800 feet below that of the subject aircraft is illustrated in FIG. 11. A final target designated as 116a, with the call-up identity 91k is also illustrated, along with its tracks 116b. However, the altitude field 116c for the target aircraft 116a contains question marks indicating that the relative altitude of this target aircraft is unknown. The altitude of a particular aircraft may not be known if that target does not include a mode-C transponder, or if the ground ATC facility does not have range and elevation angle detection capabilities.

The tracks 114b, 115b, and 116b of the respective target aircraft are ordinarily displayed on the airborne screen, unless intentionally suppressed by the flight crew in order to avoid unnecessarily cluttering the display field 80. However, in the event of a collision alert (to be discussed herein), the tracks of each target on the display are shown automatically. In the preferred embodiment of the present invention, all information except for target aircraft symbols would disappear on the event of a collision alert so that the aircraft crew's attention can be directed solely to the target aircraft within its vicinity. Thus, in the event of a collision alert, the moving map display may disappear from the screen as well as the system parameters, ATIS, and performance information normally shown in the four corners of the display. However, in the event that the alert concerns a static feature, such as a ground obstacle, or a meteorological condition, such as a heavy weather cell, the feature causing the alert remains displayed. The philosophy behind this feature is that automatic change of the display at the onset of a collision alert immediately directs the attention of the flight crew to the alert situation to the exclusion of less pressing considerations.

In order to display target aircraft tracks on the airborne console and to perform the collision alert determination, the airborne system of the present invention incorporates a novel data storage format for target information. Information concerning all aircraft within the airspace surrounding a particular ATC is broadcast to everyone within the vicinity of the ATC facility. As the air traffic information is received, the position of each target aircraft is stored in memory and analyzed as to its distance from the subject aircraft. Using data from prior data disseminations, all targets are also analyzed as to their relative velocities with respect to the subject aircraft. Targets found to be receding may require no further analysis. Distance and relative velocity calculations are done on the relative X and relative Y positions of the target aircraft with respect to the subject aircraft.

Figure 12:
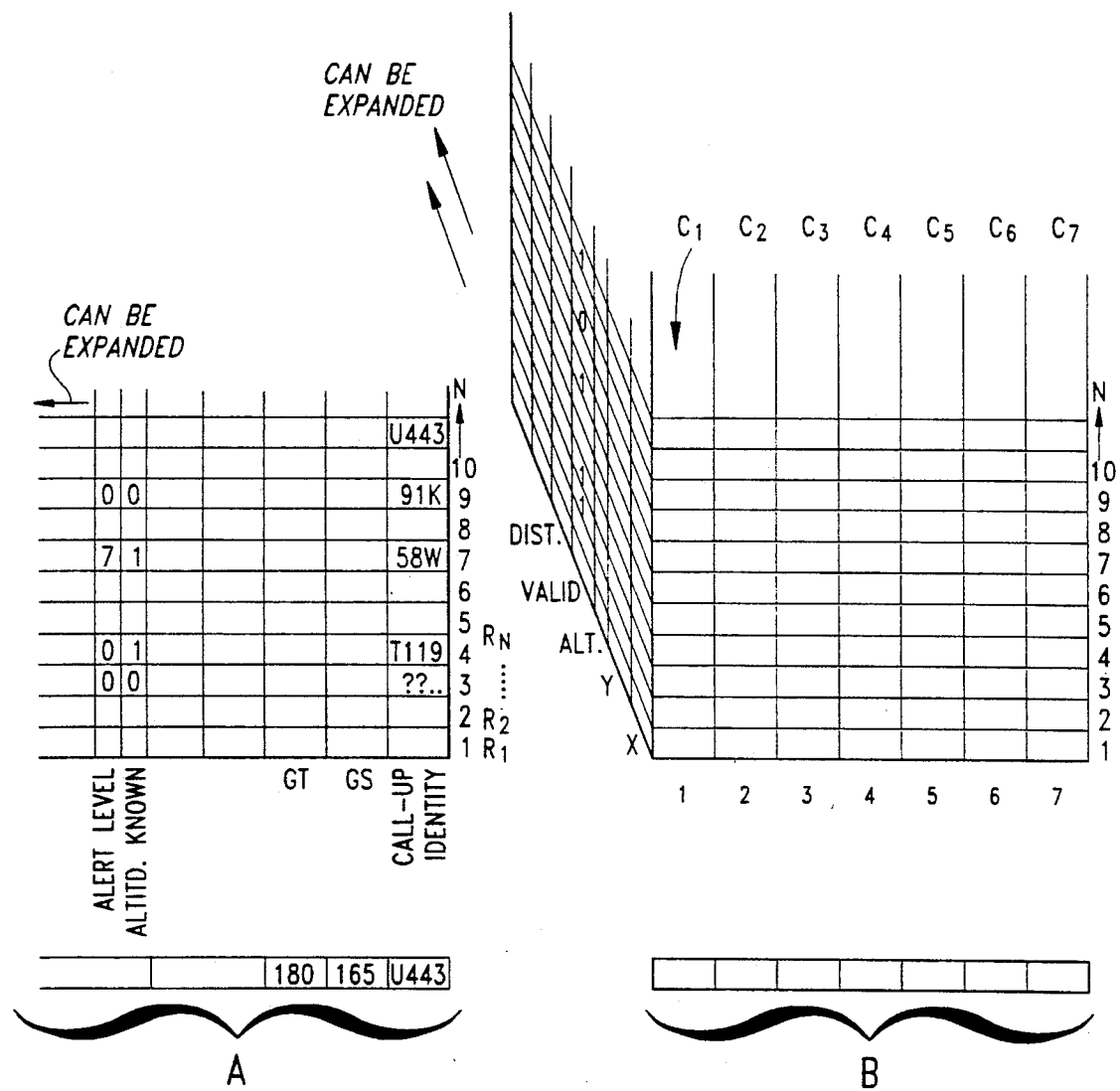
FIG. 12 is a schematic representation of the position data storage scheme for the airborne system.

The data storage array is of the form shown in FIG. 12. The structure is for the purpose of organizing the data in memory for easy access by the analysis algorithms. The two-dimensional array A is provided for storage of information for a particular aircraft that does not vary significantly with each dissemination of data, such as the target aircraft's call-up identity and intermediate results from the target analysis algorithm such as the "level" of alert or threat of each target. The row of values 1, 2, . . . N correspond to the binary serial number assigned by the ATC computers to each target aircraft and disseminated in the data stream.

The three-dimensional storage array B depicted in FIG. 12 is for storing the data on target aircraft which is updated every 4½ seconds. The columns C1-C7 of the array correspond to each sweep of the ground-based primary radar, or more accurately, each data transmission stream. As each 4-4½ second data stream is received by the subject aircraft, a new column of target aircraft information is written into the array. In the illustrated embodiment, seven information storage columns C1-C7 are provided in the array, which corresponds to at least thirty seconds of target history due to the 4-4½ second primary radar sweep time. More columns may be utilized to provide a longer target history, for instance for systems installed in high speed aircraft. On the eighth scan, the data collected from that scan is written over the data found in the first target information column C1. In the event of an error in the data transmission for a particular target aircraft, a blank entry is entered into the storage array in the portion of the array labeled "VALID". In this three dimensional array B, N rows are provided, where N is the ATC assigned binary serial number.

The lower row S of both arrays A and B includes all information identified with the subject aircraft. This information is stored in the main arrays, but is shown broken out into the row S for illustrative purposes. The row S containing information concerning the subject aircraft can be used to calculate the ground speed and ground track of the subject aircraft.

Information stored in the target information array B columns C1-C7 includes the X and Y position data as well as the altitude of the target aircraft, if known. In addition to driving the pilot's display of targets and their tracks, information stored in the array is used to analyze whether particular target aircraft are threatening targets—that is, whether an aircraft is on a collision course with the subject aircraft. The information stored in the three dimensional array B illustrated in FIG. 12 is used to calculate the distance between the target aircraft and the subject aircraft, the relative velocity, the time to point of closest encounter, etc. Once these calculations are made, additional calculations are performed to determine how far away the threatening target will be, the bearing from the subject aircraft, and the altitude above or below the subject aircraft at the time of closest encounter. This data is used to determine if the particular target is a threat to the subject aircraft.

Figure 11A:
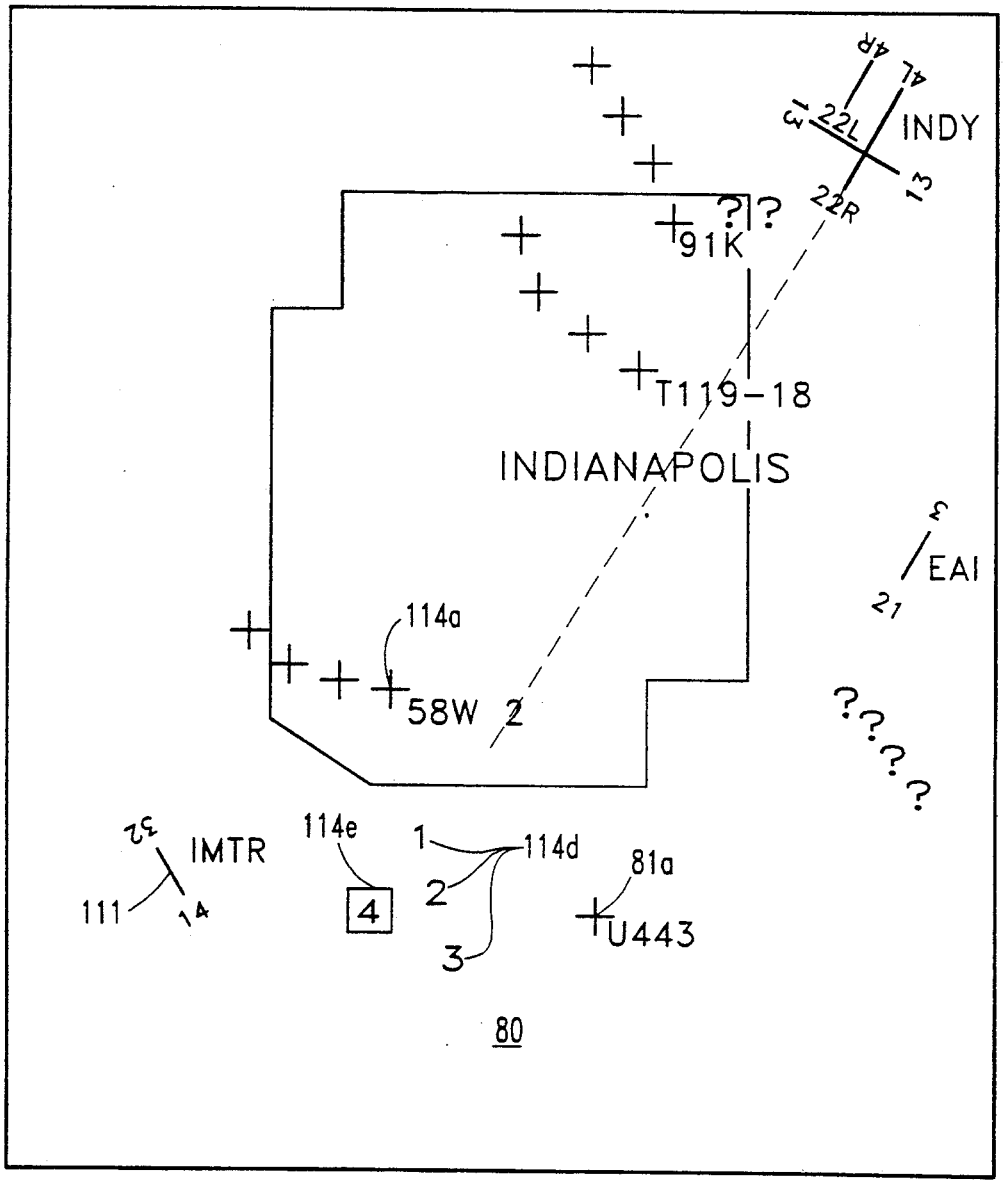
FIG. 11a is a representation of the display of FIG. 11 at a later instant in time after an aircraft conflict has been detected and a collision advisory has been issued.
Figure 11A:
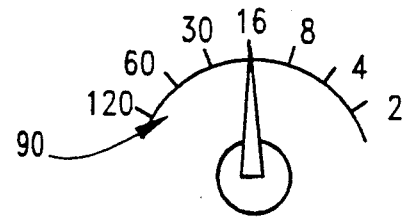
Figure 11B:
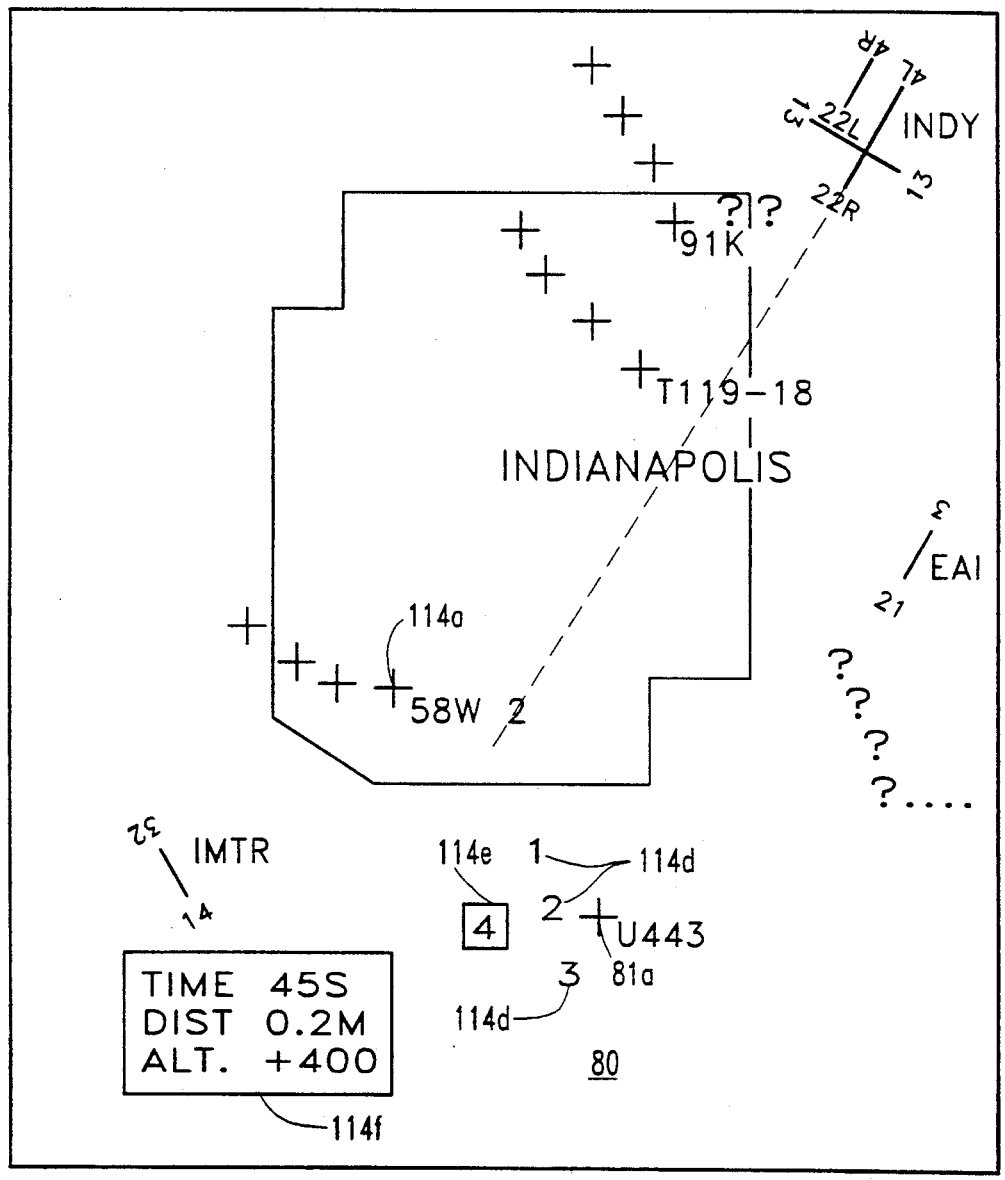
FIG. 11b is a representation of the display of FIGS. 11 and 11a at a later instant in time after an alert warning has been issued.
Figure 11C:
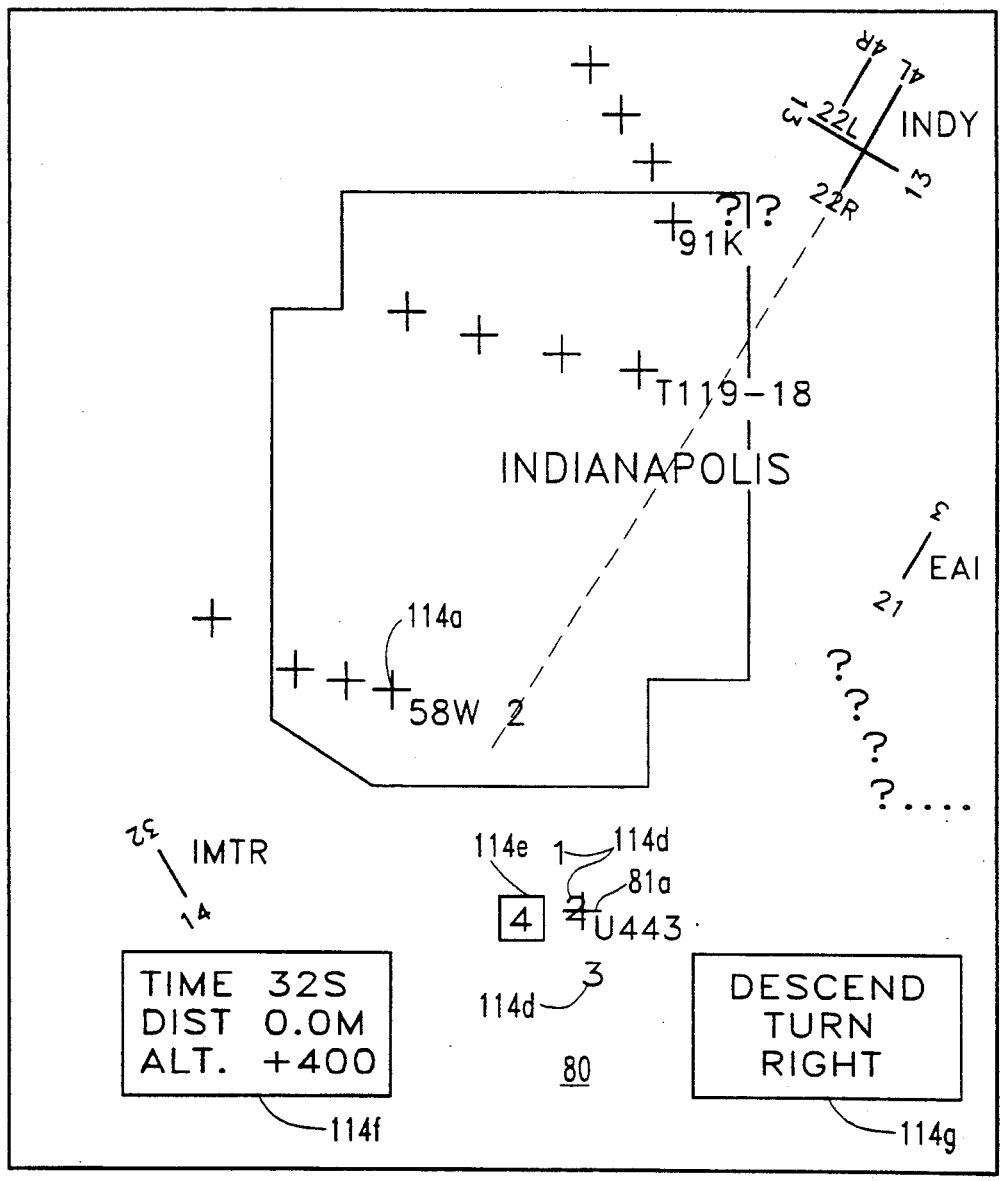
FIG. 11c is a representation of the display of FIGS. 11, 11a and 11b at a later instant in time after an evasion warning has been issued.

In the preferred embodiment, analysis of targets proceeds as described herein, with reference to chart and diagrams shown in FIGS. 13a–c and the display screens shown in FIGS. 11a–c. The receipt of disseminated data by the airborne avionics of this system and the review of the data by the avionics is a continuous process. When analysis shows that a target is not receding but is, in fact, closing in its relative position with the subject aircraft, analysis of that target is pursued. By referring to data arranged according to the data structures shown in FIG. 12, the algorithm makes a determination (geometrically as illustrated in FIGS. 13b–c) as to what distance the target will be from the subject aircraft at its closest encounter. (If the target is on a collision course with the subject aircraft, this distance is zero). The bearing to the target aircraft at this closest encounter is also calculated. Similarly, the time that will pass until the target arrives at this point is calculated. An assessment is then made as to the "threat" of the particular target. This threat is categorized into three classifications, based both on "distance at closest encounter" and "time to arrive at closest encounter". The three classifications are shown in the table in FIG. 13a.

For the advisory level of threat in boxes 118a in FIG. 13a, an audible warning is given to the crew. If the range of the display does not effectively show the target aircraft, the range is changed. All other pilot selections, such as moving map display, etc. are retained. The threat is highlighted. If tracks had not been selected for display, they now appear.

In a novel feature of the present invention, an area of airspace where the encounter will occur relative to the subject aircraft position at the time of encounter is shown graphically on the display, along with the expected relative altitude of the target aircraft. Referring to FIG. 11a, the display 80 includes the subject 81a, flight U443, and a target 114a, aircraft 58W. A series of sequential numerals 114d are displayed corresponding to the pass of aircraft 58W at its time of closest approach to flight U443. The altitude difference between the two aircraft at that time is shown in window 114e. Two of the three tracks 114d correspond to 8 sec prior and 8 sec after closest approach. These displays are based on the collision avoidance algorithms as applied to the data in the 3-D array shown in FIG. 12.

Returning to FIG. 13a, the alert level of threat of boxes 118b trigger an audible warning for the crew of the subject aircraft. Display selections are stored away and the screen goes to a mode that only shows targets, tracks, and the area of airspace where the conflict will occur, as above. Referring to FIG. 11b, tracks 114d and relative altitude window 114e appear as with an advisory display. An additional window 114f now appears showing the time to arrival in seconds, distance at closest encounter, and the relative altitude at time of closest encounter.

If the level of threat increases to "EVADE", box 118c in the table of FIG. 13a, an audible warning is again given, the target, track, and conflicted airspace symbols flash. As shown in FIG. 11c, an additional window 114g appears to display a collision avoidance strategy.

FIG. 13b shows a three-dimensional vector diagram of the change of position of the target aircraft relative to the subject aircraft for two separate disseminations of data. (Positive X is West, positive Y is North, and positive altitude is above). Calculations are based on relative distances in X, Y, and altitude components, that is the distances components are always taken with respect to the updated position of the subject aircraft to provide a true measure of the rate of closure between the target and subject aircrafts. In FIG. 13b, the subject aircraft is identified at S while the position of the target aircraft provided in the most recent data dissemination is designated T''. Lines $T''_x$, $T''_y$ and $T''_z$ represent distances in X, Y, and altitude components from the subject aircraft S to the target T''. The position of target aircraft several data disseminations prior to the most recent position is identified as T'. Lines $T'_x$, $T'_y$ and $T'_z$ represent the distance from target position T' to the target's most recent position T''. In the preferred embodiment, prior target position T' is taken at three scan intervals before the present position, unless noise interfered with prior data, in which case a second selection of prior data is made, the second selection is made of the 4 previous scans, 5 previous, 2 previous, or 6 previous as required to find clean data sweeps.

Line P' corresponds to the path of target aircraft from T' to its current position T'', while line P'' is the projected continuation of the path of target aircraft. Lines Q' and Q'' represent the projection of the corresponding paths P' and P'' onto a horizontal plane containing the subject aircraft S. Angle V (from North) is the angle the target would travel to get precisely to the subject aircraft, while angle $\beta$ is the angle (from North) the target traveled to get from its prior location T' to its present location T''.

The point in the horizontal plane of the subject aircraft S at which the target T is closest to the subject aircraft is designated I and the altitude of target above or below the subject aircraft at that time is designated J. The length of line P'' also represents the distance until the target is at the point I of closest approach. Line K is the distance from the subject aircraft to the target at point I of closest approach. FIG. 13c shows a projection of the vector diagram of FIG. 13b onto the horizontal plane containing the subject aircraft S showing path P' and predicted continuation of the path P'' of the target aircraft T relative to the position and motion of the subject aircraft.

The values of angles V and $\beta$ are calculated using standard trigonometric formulae. These angles are used in the calculation of the distance at closest approach, given by the length of line K. Calculating the time to closest encounter from the most recent position of the target aircraft at T'' involves first a determination of the closing velocity of the two aircraft based upon the length of line P' and the time interval between target positions T' and T''. That time interval is the product of the number of data disseminations used, typically three, and the sweep time, typically 4½ seconds. This calculated velocity is assumed to be constant over the distances represented by the lengths of lines P' and P''. The time to closest encounter can be determined when the velocity and length of line P'' are known.

The time to closest encounter and distance at closest encounter are calculated for each data transmission, or at least when the target data storage array is updated for each of the target aircraft within range of the ATC, regardless of the range displayed on the airborne display screen. With each conflict calculation, the table of FIG. 13a is consulted by the airborne system to assess the level of threat facing the subject aircraft and the necessity of issuing a warning to the flight crew. For optimum calculation of the level of threat, the distance to the target must include projected altitude differential, which can be calculated as outlined above.

A similar procedure is followed to determine whether particular static features, such as terrain, towers, etc., present a collision threat to the subject aircraft. In this instance, only the subject aircraft is moving relative to the static feature, so the relative heading and closing velocity between the aircraft and the static feature can be more readily determined. Data corresponding to static features may be stored in the three-dimensional array B shown in FIG. 12 or in a separate array containing relative position information. The relative position data for the static features need not be updated with every information dissemination, as in the case of target aircraft, because the locations of the features are always known. The warning scheme of FIG. 13a can be applied to collision prediction with the static features as easily as it is applied to collision prediction with target aircraft. Likewise, slow moving dynamic features, such as a storm cell, may be similarly analyzed to assist aircraft in avoiding rough or dangerous weather conditions.

DISPLAY OF NAVIGATIONAL AIDS

Figure 14:
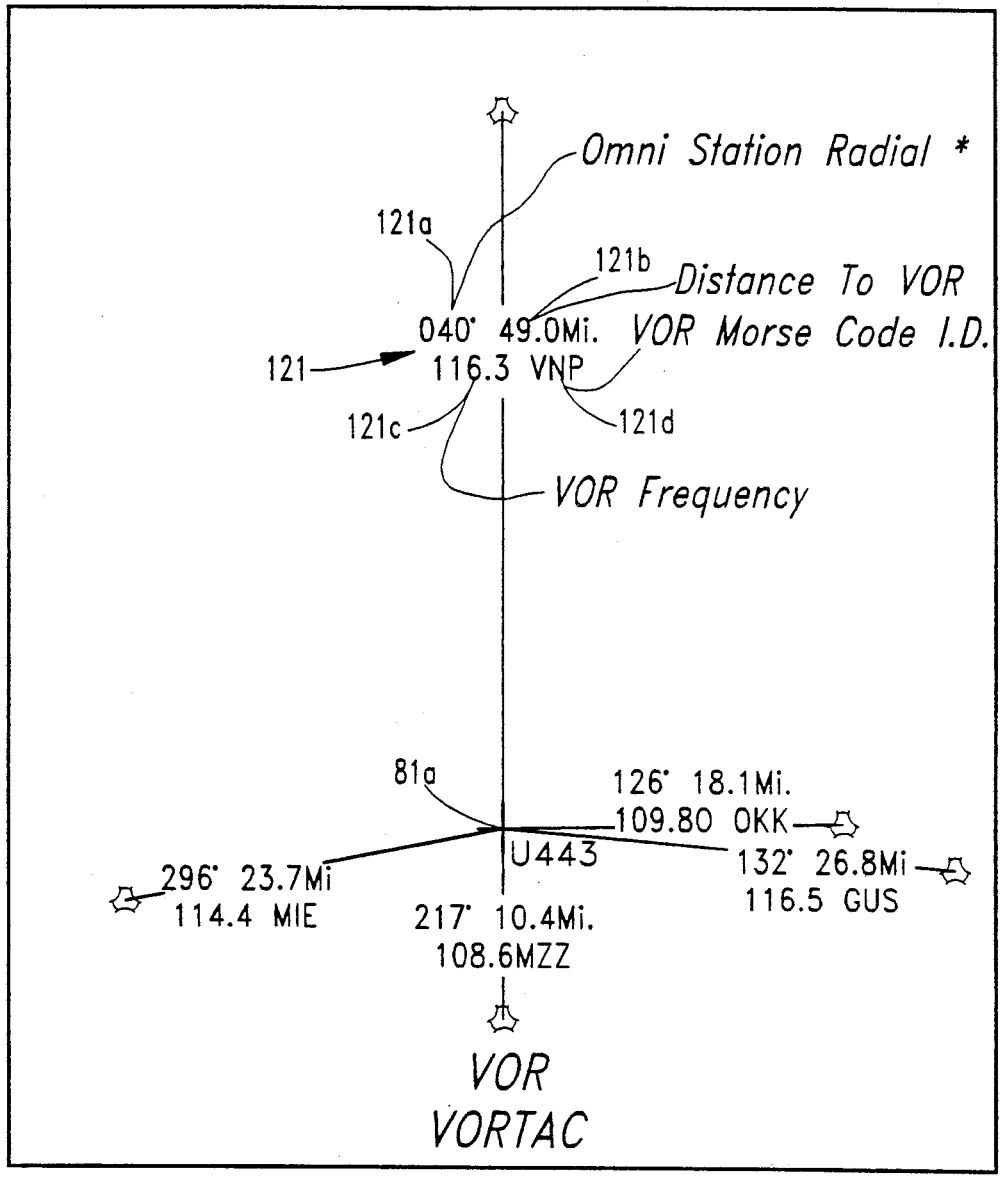
FIG. 14 is a representation of a display on the airborne system showing navigational aids relative to the subject aircraft using the VOR system.

In another aspect of the present invention, the airborne display can be actuated to display navigation aid (Navaid) information in real time. In FIG. 14, the airborne display is used to display VOR information. Such a display requires input from an on-board moving map display disk. The VOR display in FIG. 14 is egocentric with respect to the subject aircraft 81a. Radials are drawn from the subject aircraft to each of the VOR's shown on the display. Text 121 accompanying each radial 120 includes information about the radial designation 121a, the distance to the VOR 121b, the VOR frequency 121c, and the VOR Morse code identification 121d.

Figure 15:
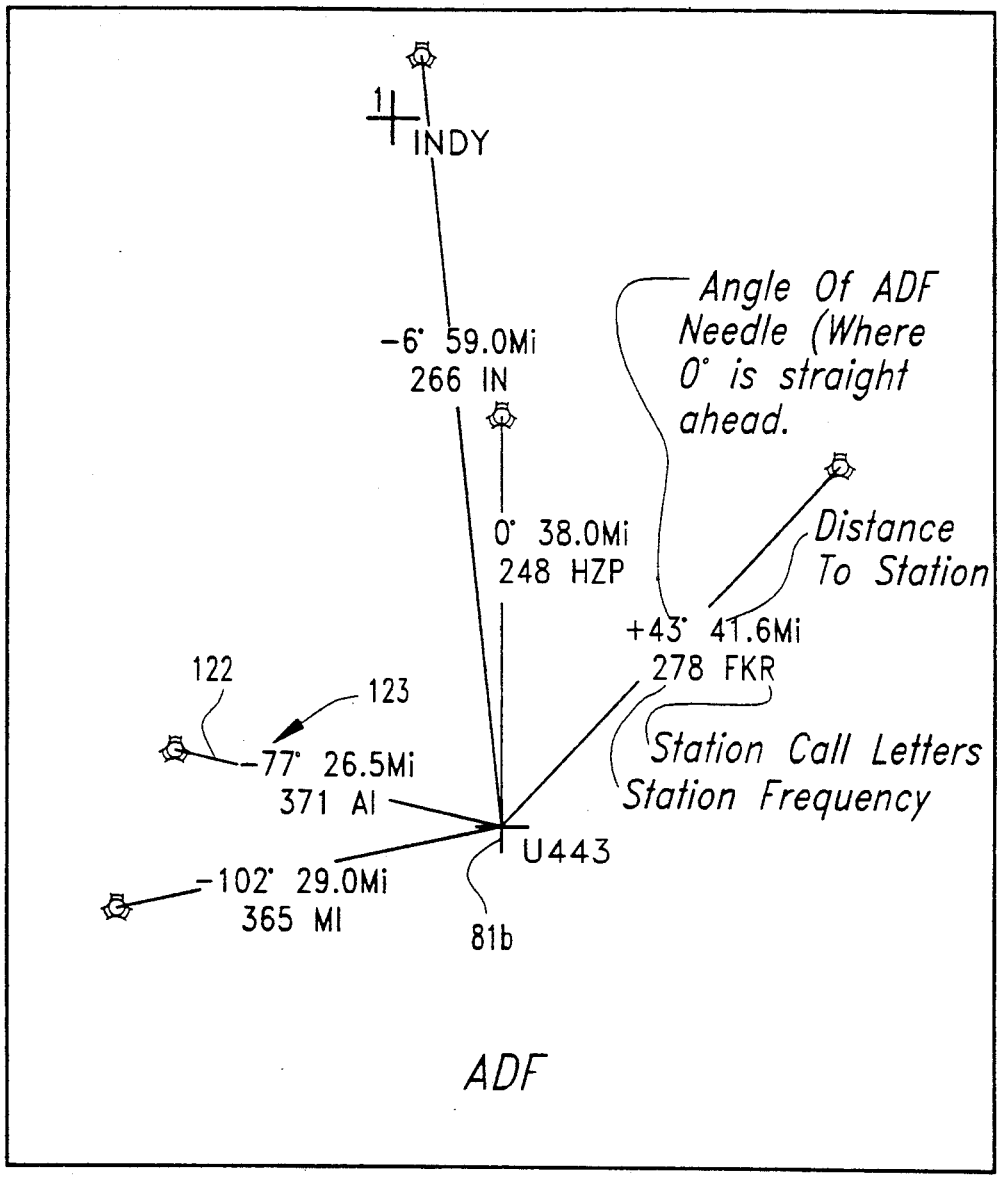
FIG. 15 is a representation of a display on the airborne system showing navigational aids relative to the subject aircraft using the ADF system.
Figure 15:
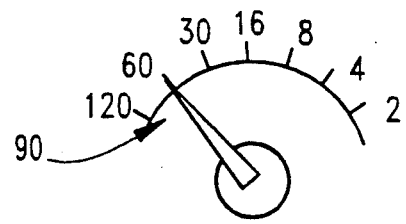

In a similar fashion, an ADF navigation display, illustrated in FIG. 15, includes each ADF facility as well as AM radio stations in the display area. Text accompanying the ADF direction lines 122 includes the angle of the ADF needle, the distance to the ADF station, the station frequency, and the station call letters. The purpose of the navigational displays of FIGS. 14 and 15 is primarily two-fold. The navigational displays can be used at initial call-up to be sure that the subject aircraft and the ground controllers agree on the identity and radar symbol of the subject aircraft. In addition, the NAV display can be used to check against the readings on the aircraft's own NAV radio indications. If the VOR or ADF information on the airborne navigational displays disagrees with the NAV radio indications, the source of the error can traced by the flight crew and contact made with the auxiliary operator of the ground-based system if necessary.

Display of ground NAV facilities is one example of the integration of pilot's chart and map information sources with the real time movements of his aircraft. Using the chart and map features of the present invention the subject aircraft's movement can be integrated with respect to an approach plate, especially on a missed approach, or an extended runway centerline can be displayed on approaches. Other moving map displays may include airways and airspace boundaries.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An airborne information dissemination system for a subject aircraft within range of an air traffic control facility (ATC) providing a generalized broadcast of dynamic conditions data in computer readable format, such data including updated position data corresponding to the position of every one of a plurality of aircraft, said information dissemination system comprising:
   a receiver in the subject aircraft to receive the dynamic conditions data including the position data;
   a display screen in the subject aircraft;
   an on-board computer having means for operating on said dynamic conditions data to generate a graphic display on said display screen from the dynamic condition data updated at subsequent receptions of the dynamic conditions data, including representations of the current positions of the plurality of aircraft derived from said position data, wherein said display is at least initially egocentric with respect to the ATC with the ATC oriented at the focus of said display;
   transformation means in said on-board computer for transforming said dynamic conditions data such that said display is made egocentric with respect to the subject aircraft with the subject aircraft at said focus; and
   means for selectably switching between said dynamic conditions data as received or said dynamic conditions data after transformation by said transformation means in generating said display.

2. The airborne information dissemination system of claim 1, in which the dynamic conditions data includes updated meteorological conditions data in computer readable format corresponding to the meteorological conditions within range of the ATC, wherein:
   said computer includes software means for integrating said meteorological conditions data with said current position data; and
   said display includes representations of the meteorological conditions derived from said meteorological data integrated with said representations of the current positions of the plurality of aircraft.

3. The airborne information dissemination system of claim 2 in which the meteorological conditions data includes wind shear data defining wind shear direction and location within range of the ATC, wherein said display includes representations of the wind shear direction and location derived from said wind shear data integrated with said representations of the current positions of the plurality of aircraft.

4. The airborne information dissemination system of claim 2 in which the meteorological conditions data includes thunderstorm data defining thunderstorm intensity and location within range of the ATC, wherein said display includes representations of the thunderstorm intensity and location derived from said thunderstorm data integrated with said representations of the current positions of the plurality of aircraft.

5. The airborne information dissemination system of claim 2 in which the meteorological conditions data includes lightning strike data defining lightning strike intensity and location within range of the ATC, wherein said display includes representations of the lightning strike intensity and location derived from said lightning strike data integrated with said representations of the current positions of the plurality of aircraft.

6. The airborne information dissemination system of claim 1, further comprising:
   a storage medium with moving map data stored therein representing a number of relatively static features;
   software means, within said on-board computer, for integrating said moving map data with said current position data; and
   said display including a representation of at least one of said number of static features derived from said moving map data integrated with said representations of the current positions of the plurality of aircraft.

7. The airborne information dissemination system of claim 6 in which the ATC is associated with an airport facility and the dynamic conditions data includes runway data corresponding to the active runway designations for the airport facility, wherein:
   said moving map data includes map data representing the airport facility consisting essentially of runways, taxiways and ground terminals; and
   said software means is operable to integrate said map data with said current position data and includes means for highlighting the active runways on the representation of the airport facility based upon the runway data received from the ATC.

8. The airborne information dissemination system of claim 6 wherein:
   said moving map data includes terrain data defining terrain features including the altitude of terrain features; and
   said software means is operable to integrate said terrain data with said current position data for integrating a representation of said terrain features derived from said terrain data onto said display.

9. The airborne information dissemination system of claim 6 wherein:
   said moving map data includes navigation data for radio navigational aids including static ground-based navaid facilities; and
   said software means is operable to integrate said navigation data with said current position data for integrating a representation of said radio navigational aids derived from said navigation data onto said display, including navigational vectors from the focus of said display to each of said ground-based navaid facilities, when said display is egocentric with respect to the subject aircraft.

10. The airborne information dissemination system of claim 1, wherein said means for generating a display includes means for variably enlarging said egocentric display about the focus of said egocentric display corresponding to a variation in range measured from the appropriate one of the ATC or the subject aircraft with respect to which the display is egocentric, whereby only those dynamic conditions within the varied range are represented in said graphic display.

11. The airborne information dissemination system of claim 1 in which the dynamic conditions data includes encoded first alphanumeric information in computer readable format containing ATIS information, active runway designations and messages from the ATC, wherein said system further comprises:

means on-board the subject aircraft for generating second alphanumeric information indicative of the flight performance of the subject aircraft; and said means for generating a display includes means for displaying said first and said second alphanumeric information on said display screen simultaneously with the display of said representations of the dynamic conditions.

12. The airborne information dissemination system of claim 1, wherein the transmission and reception of the dynamic conditions data is by VHF radio communication.

13. An airborne information dissemination system for subject aircraft within the range of a number of air traffic control facilities (ATCs) each providing a generalized broadcast of dynamic conditions data relative to the respective ATC, such data including updated position data corresponding to the position of every one of a plurality of aircraft relative to the respective ATC, said airborne information dissemination system comprising:

receiver means in the subject aircraft for substantially concurrently receiving first dynamic conditions data from a first ATC and second dynamic conditions data from a second ATC, said first and second dynamic conditions data including position data relative to the corresponding ATC;

means for storing each of said first and second dynamic conditions data therefrom updated at subsequent receptions of the dynamic conditions data;

a display screen in the subject aircraft;

means for generating a graphic display on said display screen from the stored dynamic conditions data, including representations of the current positions of the plurality of aircraft derived from the position data;

means for selectably switching said graphic display on said display screen between a display of representations of the stored first dynamic conditions data and the stored second dynamic conditions data, irrespective of from which of said first ATC or second ATC said receiver means is receiving data.

14. An airborne information dissemination system for a subject aircraft within range of an air traffic control facility (ATC) providing a generalized broadcast of dynamic conditions data in computer readable format, such data including updated position data corresponding to the position of every one of a plurality of aircraft and meteorlogical data corresponding to meteorological conditions, the information dissemination system comprising:

a receiver in the subject aircraft to receive the dynamic conditions data including the position data and the meteorological data;

a display screen in the subject aircraft;

an on-board computer having software means for integrating said position data with said meteorological data to generate integrated data; and means for operating on said integrated data to generate a graphic display on said display screen from the dynamic conditions data updated at subsequent receptions of the dynamic conditions data, including representations of the current positions of the plurality of aircraft derived from the position data integrated with representations of the meteorological conditions derived from the meteorological data.

15. An airborne air traffic monitoring system for a subject aircraft within range of an air traffic control facility (ATC) providing a generalized broadcast of updated position data corresponding to the position of every one of a plurality of aircraft, said system comprising:

receiver means in the subject aircraft for receiving the position data at predetermined periodic time intervals;

a display screen in the subject aircraft;

means for generating a graphic display on said display screen of a representation of the current positions of the plurality of aircraft derived from the position data updated at subsequent receptions of the position data; and conflict warning means, including a computer, for providing a warning of a potential collision between the subject aircraft and a target aircraft of the plurality of aircraft, said conflict warning means including;

means for storing the position data for the plurality of aircraft for a most recent number of said time intervals;

first program means for using said stored position data to predict a point of closest approach of the target aircraft to the subject aircraft and to calculate a path of potential collision between the subject aircraft and the target aircraft; and second program means for displaying a representation of said target aircraft relative to the subject aircraft at said predicted point of closest approach and a representation of any recently calculated potential collision paths onto said display screen along with the display of the current position of the subject aircraft.

16. The airborne air traffic control system of claim 15, wherein: said first program means includes;

first means for calculating the separation between the target and the subject aircraft at said point of closest approach; and second means for calculating the time until said point of closest approach and for issuing a number of levels of warning based upon said calculated time, including an evasion warning; and said second program means includes;

means for displaying said time and said separation adjacent the display of said representation of said path for each of said levels of warning; and means, responsive to the issuance of said evasion warning, for causing the dispaly of the representations of the target aircraft to flash on said display screen.

17. The airborne air traffic control system of claim 16, wherein said second program means includes means, responsive to the issuance of said evasion warning, for determining a collision avoidance maneuver to be taken by the subject aircraft to avoid a collision with the target aircraft and for displaying said maneuver on said display screen.

18. An airborne air traffic monitoring system for a subject aircraft within range of an air traffic control facility (ATC) providing a generalized broadcast of updated position data corresponding to the position of every one of a plurality of aircraft, said system comprising:

receiver means in the subject aircraft for receiving the position data at predetermined periodic time intervals;
  a display screen in the subject aircraft;
  a computer including conflict warning means for using the position data to detect a potential collision between the subject aircraft and a target aircraft of the plurality of aircraft and for providing a warning therefor; and
  means for generating a first graphic display on said display screen when no potential collision is detected of a representation of the current positions of each of the plurality of aircraft derived from the position data, and for automatically substituting a second graphic display when a potential collision is detected of a representation of the positions of the target aircraft and the subject aircraft only, wherein the representation of the position of the target aircraft includes a track representing the consecutive positions of the target aircraft relative to the subject aircraft over a most recent number of said time intervals.

19. The airborne air traffic control system of claim 18, further comprising:

a storage medium with moving map data stored therein representing terrain features and including altitude data for said terrain features;
  means for integrating a representation of said static features derived from said moving map data onto said graphic display;
  program means within said computer for using the position data and said moving map data to detect a potential collision between the subject aircraft and said terrain features, including means for warning of said potential collision.

* * * * *